United States Patent
Peterson et al.

(10) Patent No.: US 12,071,537 B2
(45) Date of Patent: *Aug. 27, 2024

(54) COMPOSITE EXTRUSION WITH NON-ALIGNED FIBER ORIENTATION

(71) Applicant: Andersen Corporation, Bayport, MN (US)

(72) Inventors: Trevor Dean Peterson, Stillwater, MN (US); Jessica Kathryn Ehrlichmann, Ramsey, MN (US); Patrick Jerome Gronlund, Mason, WI (US)

(73) Assignee: Andersen Corporation, Bayport, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,871

(22) Filed: Feb. 10, 2022

(65) Prior Publication Data

US 2022/0162437 A1    May 26, 2022

Related U.S. Application Data

(63) Continuation of application No. 16/730,110, filed on Dec. 30, 2019, now Pat. No. 11,267,963, which is a
(Continued)

(51) Int. Cl.
*C08L 27/06* (2006.01)
*B29C 48/11* (2019.01)
(Continued)

(52) U.S. Cl.
CPC .............. *C08L 27/06* (2013.01); *B29C 48/11* (2019.02); *B29C 48/12* (2019.02); *B29C 48/16* (2019.02);
(Continued)

(58) Field of Classification Search
CPC ......... B29C 48/21; B29C 48/12; B29C 48/16; B29C 70/025; E06B 3/20; E06B 3/22;
(Continued)

(56) References Cited

U.S. PATENT DOCUMENTS

| 3,328,501 A | 6/1967 | Barnett |
| 3,931,094 A | 1/1976 | Segal et al. |

(Continued)

FOREIGN PATENT DOCUMENTS

| CN | 1948665 | 4/2007 |
| CN | 102702649 | 10/2012 |

(Continued)

OTHER PUBLICATIONS

"Biostrength 150 Technical Datasheet," Published by Arkema and archived online on Jun. 7, 2016 at https://web.archive.org/web/20160607205030/https://www.palmerholland.com/Assets/User/Documents/Product/45833/5890/MITM10308.PDF (Year: 2016), 2 pages.

(Continued)

*Primary Examiner* — Camie S Thompson
(74) *Attorney, Agent, or Firm* — Pauly, DeVries Smith & Deffner LLC

(57) ABSTRACT

Embodiments herein include compositions, extruded articles, and methods of making the same. In an embodiment, an extruded article is included. The extruded article can include an extruded segment comprising a first composition. The first composition can include a polymer resin, particles and fibers. The fibers can be disposed within the first composition exhibiting a substantially non-aligned directional orientation. In an embodiment, an extruded article is included having a first portion comprising a first composition having a first fiber orientation and a second portion comprising a second composition having a second
(Continued)

fiber orientation. The first composition can include a polymer resin and fibers. The second composition can include a polymer resin, particles and fibers. The fibers of the second composition can be oriented more randomly than the fibers of the first composition. Other embodiments are also included herein.

19 Claims, 19 Drawing Sheets

Related U.S. Application Data continuation of application No. 15/439,586, filed on Feb. 22, 2017, now Pat. No. 10,550,257.

(60) Provisional application No. 62/298,660, filed on Feb. 23, 2016.

(51) Int. Cl.

| | |
|---|---|
| *B29C 48/12* | (2019.01) |
| *B29C 48/16* | (2019.01) |
| *B29C 48/21* | (2019.01) |
| *B29C 48/285* | (2019.01) |
| *B29K 105/06* | (2006.01) |
| *B29K 105/12* | (2006.01) |
| *B29K 311/10* | (2006.01) |
| *B29K 711/10* | (2006.01) |
| *C08K 3/34* | (2006.01) |
| *C08K 7/02* | (2006.01) |
| *C08K 7/20* | (2006.01) |
| *C08L 97/02* | (2006.01) |

(52) U.S. Cl.
CPC .......... *B29C 48/21* (2019.02); *B29C 48/2886* (2019.02); *C08K 3/34* (2013.01); *C08K 7/02* (2013.01); *C08K 7/20* (2013.01); *C08L 97/02* (2013.01); *B29K 2105/06* (2013.01); *B29K 2105/12* (2013.01); *B29K 2203/00* (2013.01); *B29K 2311/10* (2013.01); *B29K 2711/10* (2013.01)

(58) Field of Classification Search
CPC .......... C08L 27/06; C08L 97/02; C08K 7/02; C08K 7/20; B32B 1/00; B32B 2262/101; B32B 2264/067; B32B 2419/00; B32B 27/20; B32B 27/22; B29L 2031/005; B29K 2101/12; B29K 2105/06; B29K 2105/12; B29K 2711/10
USPC ....................... 428/297.4, 323, 332
See application file for complete search history.

(56) References Cited

U.S. PATENT DOCUMENTS

| | | | |
|---|---|---|---|
| 3,996,082 A | 12/1976 | Leatherman | |
| 4,183,777 A | 1/1980 | Summers et al. | |
| 4,514,449 A | 4/1985 | Budich et al. | |
| 4,627,472 A | 12/1986 | Goettler et al. | |
| 4,720,951 A | 1/1988 | Thorn et al. | |
| 4,958,469 A | 9/1990 | Plummer | |
| 5,145,892 A | 9/1992 | Yasukawa et al. | |
| 5,156,907 A | 10/1992 | Layden et al. | |
| 5,205,102 A | 4/1993 | Plummer | |
| 5,264,261 A | 11/1993 | Bush | |
| 5,273,819 A | 12/1993 | Jex | |
| 5,406,768 A | 4/1995 | Giuseppe et al. | |
| 5,441,801 A | 8/1995 | Deaner et al. | |
| 5,486,553 A | 1/1996 | Deaner et al. | |
| 5,497,594 A | 3/1996 | Giuseppe et al. | |
| 5,508,072 A | 4/1996 | Hodson et al. | |
| 5,518,677 A | 5/1996 | Deaner et al. | |
| 5,539,027 A | 7/1996 | Deaner et al. | |
| 5,612,413 A | 3/1997 | Rozkuszka et al. | |
| 5,661,939 A | 9/1997 | Coulis et al. | |
| 5,695,874 A | 12/1997 | Deaner et al. | |
| 5,705,571 A | 1/1998 | Tsiang et al. | |
| 5,707,571 A | 1/1998 | Reedy | |
| 5,773,138 A | 6/1998 | Seethamraju et al. | |
| 5,827,607 A | 10/1998 | Deaner et al. | |
| D402,770 S | 12/1998 | Hendrickson et al. | |
| 5,874,146 A | 2/1999 | Kagan et al. | |
| 5,882,564 A | 3/1999 | Puppin | |
| 5,902,657 A | 5/1999 | Hanson et al. | |
| 5,932,334 A | 8/1999 | Deaner et al. | |
| 5,948,524 A | 9/1999 | Seethamraju et al. | |
| 5,981,067 A | 11/1999 | Seethamraju et al. | |
| 5,985,429 A | 11/1999 | Plummer et al. | |
| 6,004,668 A | 12/1999 | Deaner et al. | |
| 6,015,611 A | 1/2000 | Deaner et al. | |
| 6,015,612 A | 1/2000 | Deaner et al. | |
| 6,054,207 A | 4/2000 | Finley | |
| 6,122,877 A | 9/2000 | Hendrickson et al. | |
| 6,140,455 A | 10/2000 | Nagashima et al. | |
| 6,197,412 B1 | 3/2001 | Jambois | |
| 6,210,792 B1 | 4/2001 | Seethamraju et al. | |
| 6,265,037 B1 | 7/2001 | Godavarti et al. | |
| 6,280,667 B1 | 8/2001 | Koenig et al. | |
| 6,342,172 B1 | 1/2002 | Finley | |
| 6,346,160 B1 | 2/2002 | Puppin | |
| 6,357,197 B1 | 3/2002 | Serino et al. | |
| 6,365,081 B1 | 4/2002 | Beck | |
| 6,875,385 B2 | 4/2005 | Hawley et al. | |
| 6,899,782 B1 | 5/2005 | Chang et al. | |
| 7,041,716 B2 | 5/2006 | Ton-That et al. | |
| 7,173,082 B2 | 2/2007 | Ahn et al. | |
| 7,691,305 B2 | 4/2010 | Sutton et al. | |
| 7,858,008 B2 | 12/2010 | Lee et al. | |
| 8,211,341 B2 | 7/2012 | Lustiger | |
| 8,586,662 B2 | 11/2013 | Harder et al. | |
| 8,784,719 B2 | 7/2014 | Lingannaiah et al. | |
| 8,829,097 B2 | 9/2014 | Deaner et al. | |
| 8,852,488 B2 | 10/2014 | Sain et al. | |
| 8,940,132 B2 | 1/2015 | Sain et al. | |
| 9,221,974 B2 | 12/2015 | Rexin et al. | |
| 10,550,257 B2 * | 2/2020 | Peterson | B29C 48/21 |
| 11,267,963 B2 * | 3/2022 | Peterson | C08L 27/06 |
| 11,680,439 B2 | 6/2023 | Gronlund | |
| 11,813,818 B2 | 11/2023 | Ehrlichmann et al. | |
| 2002/0106498 A1 | 8/2002 | Deaner et al. | |
| 2006/0065993 A1 | 3/2006 | Stucky et al. | |
| 2006/0175325 A1 | 8/2006 | Day et al. | |
| 2007/0141316 A1 | 6/2007 | McGrath et al. | |
| 2008/0021135 A1 | 1/2008 | Garft et al. | |
| 2009/0181207 A1 | 7/2009 | Michalik et al. | |
| 2009/0246544 A1 | 10/2009 | Narita et al. | |
| 2012/0220697 A2 | 8/2012 | Deaner et al. | |
| 2013/0217815 A1 | 8/2013 | Deaner et al. | |
| 2017/0240737 A1 | 8/2017 | Peterson et al. | |
| 2017/0240738 A1 | 8/2017 | Ehrlichmann et al. | |
| 2019/0071918 A1 | 3/2019 | Gronlund et al. | |
| 2020/0131355 A1 | 4/2020 | Peterson et al. | |

FOREIGN PATENT DOCUMENTS

| | | |
|---|---|---|
| EP | 0458520 | 11/1997 |
| EP | 0902148 | 3/1999 |
| EP | 1589076 | 10/2005 |
| EP | 1610938 | 1/2006 |
| EP | 1842657 | 10/2007 |
| EP | 2031169 | 3/2009 |
| EP | 2301169 | 3/2011 |
| EP | 2384879 | 11/2011 |
| EP | 3419804 | 1/2019 |
| EP | 3419805 | 1/2019 |
| EP | 3669040 | 6/2020 |
| JP | 2008273217 | 11/2008 |
| JP | 2012200894 | 10/2012 |
| WO | 2004083541 | 9/2004 |

(56) References Cited

FOREIGN PATENT DOCUMENTS

| WO | 2005090469 | 9/2005 |
|---|---|---|
| WO | 2009098280 | 8/2009 |
| WO | 2010008199 | 1/2010 |
| WO | 2012105915 | 8/2012 |
| WO | 2015120429 | 8/2015 |
| WO | 2017147259 | 8/2017 |
| WO | 2017147268 | 8/2017 |
| WO | 2019036601 | 2/2019 |

OTHER PUBLICATIONS

"Final Office Action," for U.S. Appl. No. 16/104,029 (our file 100.0015USU1) dated Oct. 19, 2022 (14 pages).
Giles, Harold, et al. "Extrusion: The Definitive Processing Guide and Handbook," William Andrew Inc., 2005, pp. 166, 375-376, and 386-388 (9 pages).
"Non-Final Office Action," for U.S. Appl. No. 16/104,029 dated Mar. 25, 2022 (17 pages).
"Response to Final Office Action," for U.S. Appl. No. 15/439,603 filed Aug. 12, 2022 (10 pages).
"Response to Non-Final Office Action," for U.S. Appl. No. 16/104,029 filed Jul. 25, 2022 (9 pages).
"Communication Pursuant to Article 94(3) EPC," for European Patent Application No. 17709855.5 dated May 25, 2021 (5 pages).
"Communication Pursuant to Article 94(3) EPC," for European Patent Application No. 17711037.6 dated May 17, 2021 (4 pages).
"DuPont Elvaloy Polymer Modifier for Rigid PVC Compounds Product Brochure," http://www.dupont.com/content/dam/dupont/products-and-services/packaging-materials-and-solutions/packaging-materials-and-solutions-landing/documents/Elvaloy_RigidPVC_Brochure.pdf, Oct. 2009 (4 pages).
File History for European Patent Application No. 17709855.5 downloaded Mar. 10, 2022 (322 pages).
File History for U.S. Appl. No. 16/730,110 downloaded Mar. 10, 2022 (264 pages).
File History for U.S. Appl. No. 15/439,586 downloaded Mar. 10, 2022 (239 pages).
File History for European Patent Application No. 17711037.6 downloaded Mar. 10, 2022 (299 pages).
File History for U.S. Appl. No. 15/439,603 downloaded Mar. 10, 2022 (316 pages).
File History for European Patent Application No. 18789513.1 downloaded Mar. 10, 2022 (501 pages).
File History for U.S. Appl. No. 16/104,029 downloaded Mar. 10, 2022 (267 pages).
"International Preliminary Report on Patentability," for PCT Application No. PCT/US2017/019072 dated Sep. 7, 2018 (10 pages).
"International Preliminary Report on Patentability," for PCT Application No. PCT/US2017/019085 dated Sep. 7, 2018 (10 pages).
"International Preliminary Report on Patentability," for PCT Application No. PCT/US2018/046886 dated Feb. 27, 2020 (8 pages).
"International Search Report and Written Opinion," for PCT Application No. PCT/US2017/019072 dated May 15, 2017 (32 pages).
"International Search Report and Written Opinion," for PCT Application No. PCT/US2017/019085 dated May 31, 2017 (14 pages).
"International Search Report and Written Opinion," for PCT Application No. PCT/US2018/046886 dated Jan. 7, 2019 (11 pages).
Clemons, Craig M. "Wood Flour," Functional Fillers for Plastics, 2010, p. 269-283 (24 pages).
"Communication Pursuant to Article 94(3) EPC," for European Patent Application No. 17711037.6 dated Dec. 23, 2022 (4 pages).
"Non-Final Office Action," for U.S. Appl. No. 15/439,603 dated Dec. 13, 2022 (18 pages).
"Notice of Allowance," For U.S. Appl. No. 16/104,029 dated Feb. 6, 2023 (10 pages).
"Response to Final Office Action," for U.S. Appl. No. 16/104,029 filed Jan. 19, 2023 (8 pages).
"Communication Pursuant to Article 94(3) EPC," for European Patent Application No. 17709855.5 mailed Feb. 22, 2023 (5 pages).
"Response to Communication Pursuant to Article 94(3) EPC," for European Patent Application No. 17709855.5 filed Jun. 19, 2023 (10 pages).
"Office Action," for Canadian Patent Application No. 3015339 mailed Dec. 7, 2023 (7 pages).
"Office Action," for Canadian Patent Application No. 3015362 mailed Dec. 11, 2023 (4 pages).

* cited by examiner

COMPOSITE EXTRUSION WITH NON-ALIGNED FIBER ORIENTATION

This application is a continuation of U.S. application Ser. No. 16/730,110, filed Dec. 30, 2019, which is a continuation of U.S. application Ser. No. 15/439,586 filed Feb. 22, 2017, which claims the benefit of U.S. Provisional Application No. 62/298,660, filed Feb. 23, 2016, the contents of all of which are herein incorporated by reference in their entireties.

FIELD

Embodiments herein relate to composite extrusions. More specifically, embodiments herein relate to composite extrusions with non-aligned fiber orientation.

BACKGROUND

Conventional window and door manufacturers have commonly used wood and metal components in forming structural members. Commonly, residential windows are manufactured from milled wood products or extruded aluminum or polymeric parts that are assembled with glass to form typically double hung or casement units. Wood windows, while structurally sound, useful and well adapted for use in many residential installations, can deteriorate under certain circumstances. Wood windows also require painting and other periodic maintenance. Wood windows also suffer from cost problems related to the availability of suitable wood for construction. Clear wood products are slowly becoming scarcer and are becoming more expensive as demand increases. Metal components are often combined with glass and formed into single unit sliding windows. Metal windows can suffer from substantial energy loss during winter months.

Extruded thermoplastic materials have also been used as components in window and door manufacture. Filled and unfilled thermoplastics have been extruded into useful seals, trim, weather stripping, coatings and other window construction components In some extrusions, glass fibers have been added for purposes of reinforcement. The fibers typically orient themselves such that their lengthwise axis is parallel to the direction of extrusion of the material.

SUMMARY

Embodiments herein include compositions, extruded articles, and methods of making the same. In an embodiment, an extruded article is included. The extruded article can include an extruded segment comprising a first composition. The first composition can include a polymer resin, particles and fibers. The fibers can be disposed within the first composition exhibiting a substantially non-aligned directional orientation.

In an embodiment, an extruded article is included having a first portion comprising a first composition having a first fiber orientation and a second portion comprising a second composition having a second fiber orientation. The first composition can include a polymer resin and fibers. The second composition can include a polymer resin, particles and fibers. The fibers of the second composition can be oriented more randomly than the fibers of the first composition.

In an embodiment, a method of making an extruded article is included. The method can include compounding materials comprising a polymer resin, particles, and fibers into pellets. The method can further include extruding the pellets to form a portion of an extruded article. The fibers can be disposed in a substantially non-aligned directional orientation.

In an embodiment, a method of making an extruded article is included. The method can include extruding a composition to form a portion of an extruded article. The composition can include a polymer resin, particles, and fibers. The fibers can be disposed in a substantially non-aligned directional orientation.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
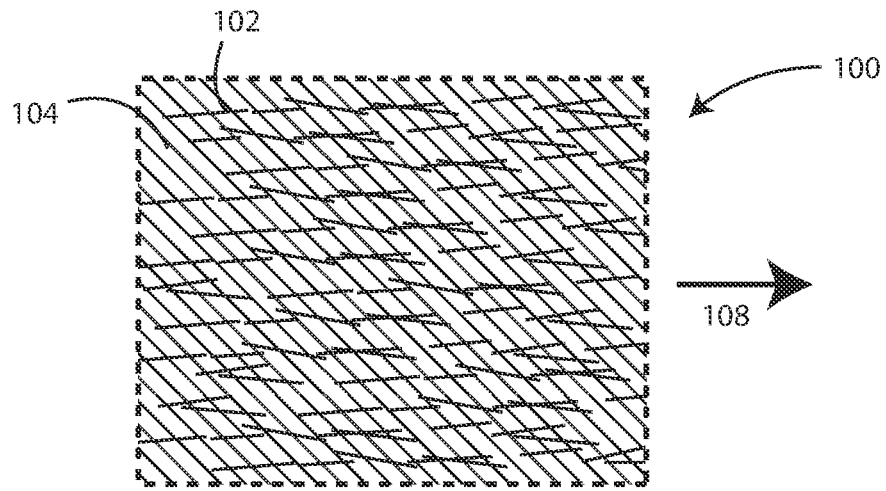
FIG. 1 is a cross-sectional view of a portion of an extrusion.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As used herein, the term "compounding" refers to the process of combining a polymeric material with at least one other ingredient, either polymeric or non-polymeric, at a temperature sufficiently elevated to allow the ingredients to be mixed into a molten mass.

As used herein, the term "resin" shall refer to the thermoplastic polymer content of the extruded or pultruded composition. The resin portion of the composition excludes any polymer content provided by processing aids.

As used herein, the term "substantially random" with regard to fiber orientation shall refer to the state of the fibers in an extrusion with their lengthwise axis not being substantially aligned in parallel with the direction of extrusion of the article. The phrase "substantially random" does not require the orientation of the fibers to be completely mathematically random.

As used herein, the term "non-aligned" with regard to fiber orientation shall refer to the state of fibers in an extrusion with their lengthwise axis not exhibiting the same degree of alignment in parallel with the direction of extrusion that an otherwise similar composition lacking particles as described herein would assume after going through an extrusion process. Non-aligned fibers can exhibit an average offset angle relative to the extrusion direction of greater than 20 degrees.

As described above, glass fibers have been added for purposes of reinforcement to extrusions. However, such fibers typically orient themselves such that their lengthwise axis is parallel to the direction of extrusion of the material.

However, it is disclosed herein that the use of certain particles in combination with fibers and resin (and in some contexts other components) can act to make the orientation of the fiber substantially more random that would otherwise occur during an extrusion process. Some properties can be impacted based on the direction of fiber orientation and so being able to manipulate fiber orientation can be a major advantage when designing extrudates.

In specific, it has been discovered that the presence of particles in the compositions herein causes the orientation of fibers to become more non-aligned than they would otherwise be. As such, compositions herein can include particles as a part of the compositions that are extruded. Composites formed herein can substantially lack gas bubbles. In some embodiments, composites formed herein can include less than 10%, 5%, 2%, 1%, 0.5%, or 0.1% entrained gas by volume.

Referring now to FIG. 1, a schematic diagram of a portion of an extrudate is shown exhibiting typical alignment of fibers resulting from an extrusion process. In particular, the extruded composition 100 includes fibers 102 dispersed within other components 104 of the extrudate such as resin and the like. In this illustrative view, it can be seen that the fibers are largely oriented parallel to the direction of extrusion 108. In some circumstances this may be desirable, such as to maximize strength properties that are affected by the amount of fibers that are oriented parallel to the direction of extrusion. Without intending to be bound by theory, it is believed that flexural stiffness as measured perpendicular to the direction of extrusion can be enhanced by fibers oriented in alignment with the direction of extrusion 108.

However, there can also be drawbacks associated with such fiber alignment. For example it is believed that this alignment results in increased shrinkage in certain directions, decreased long term dimensional stability, may promote crack propagation, difficulties with increasingly complicated part/profile designs, and increasingly complicated mold/die designs. Long term dimensional stability issues and/or failures—such as creep/creep rupture, stress relaxation, bowing, warping, etc. can also be issue with such fiber alignment.

As such, in some circumstances, the non-alignment (or substantially random alignment) of fibers with respect to the direction of extrusion can be desirable. For example, in some embodiments, it is believed that the non-aligned orientation can enhance one or more of resistance to crack propagation, resistance to cupping, resistance to creep, stress relaxation, improved long term dimensional stability, resistance to damage in areas were the material is perforated with fasteners such as screw chases, resistance to damage on ends (reduced chip out), responses to loads that may be applied successively from multiple different directions, resistance to damage from twisting forces, in particular areas such as joints between walls of a profile extrusion having hollow portions, or in circumstances where the exact direction of applied forces may not be predictable, such as in the context of impacts of objects.

Figure 2:
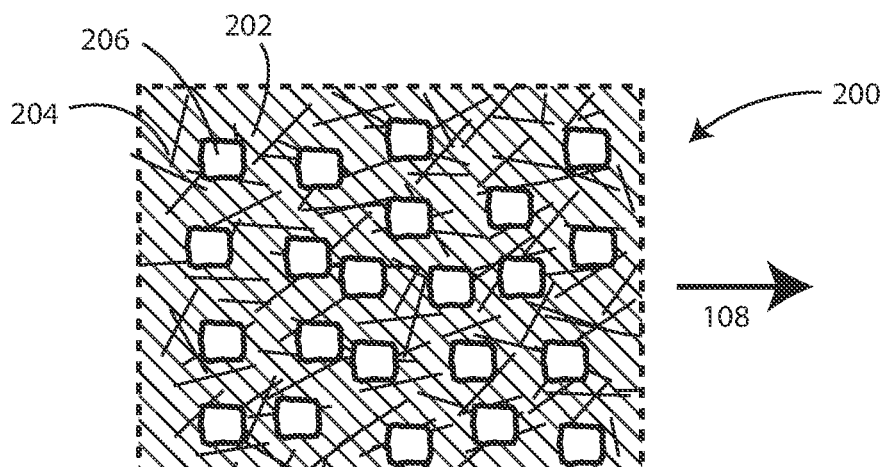
FIG. 2 is a cross-sectional view of a portion of an extrusion in accordance with various embodiments herein.

Referring now to FIG. 2, a schematic diagram is shown of a portion of an extrudate in accordance with various embodiments herein exhibiting a non-aligned orientation of fibers. Similar to as in FIG. 1, the extruded composition 200 includes fibers 202 dispersed within other components 204 of the extrudate such as resin and the like. However, in this embodiment, particles 206 are included with the composition 200. As a result, in this illustrative view, it can be seen that the fibers are non-aligned with respect to the direction of extrusion 108.

It will be appreciated that there are design scenarios where it can be desirable to combine the unique structural properties of extrudates having non-aligned fibers along with extrudates having fibers oriented substantially parallel with respect to the direction of extrusion and/or extrudates lacking fibers. In various embodiments herein, extrudates are included having at least one portion (segment, part, layer, etc.) with fibers that are oriented substantially parallel to the direction of extrusion and at least one portion (segment, part, layer, etc.) with non-aligned fibers.

Figure 3:
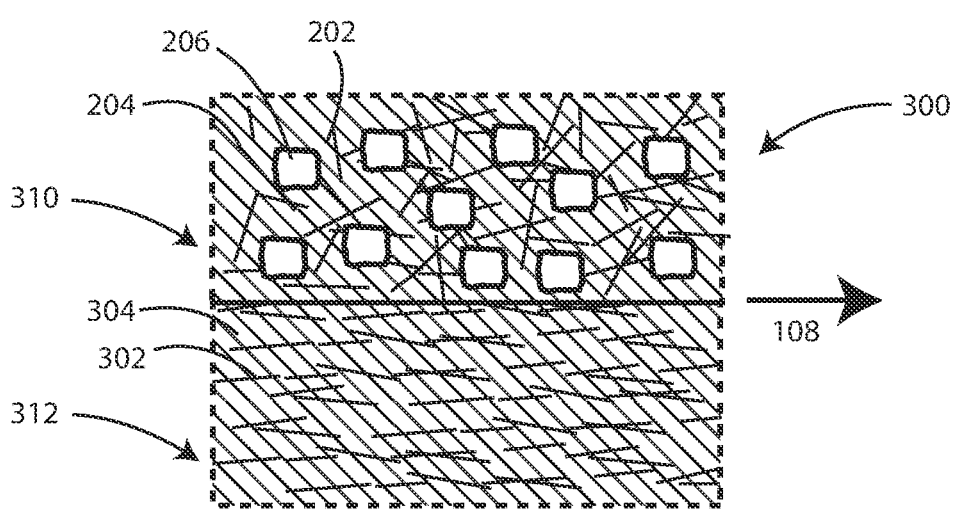
FIG. 3 is a cross-sectional view of a portion of an extrusion in accordance with various embodiments herein.

Referring now to FIG. 3, the article 300 includes a first extruded portion 310 (or segment, part, layer, etc.) that includes non-aligned (with respect to the direction of extrusion 108) fibers 202 dispersed within other components 204 of the extrudate such as resin and particles 206. The article 300 also includes a second extruded portion 312 (or segment, part, layer, etc.) that includes fibers 302 dispersed within other components 304 of the extrudate such as resin and the like. The second extruded portion 312 lacks particles and the fibers 302 are oriented substantially parallel to the direction of extrusion 108.

The degree of fiber non-alignment can vary. In some embodiments, fibers can exhibit an average offset angle relative to the extrusion direction (i.e., an average angle between their lengthwise axis and the direction of extrusion) of greater than 10, 15, 20, 25, 30, 35, 40, or 45 degrees. In some embodiments, the fibers can exhibit an average offset angle relative to the direction of extrusion of less than 90, 85, 80, 75, 70, 65, 60, 55, or 50 degrees. In some embodiments, the average offset angle can fall within a range wherein any of the foregoing numbers can serve as the upper or lower bounds of the range, provided that the upper bound is larger than the lower bound. For example, in some embodiments, the fibers can exhibit an average offset angle relative to the extrusion direction of between 30 and 80 degrees. In some embodiments, the fibers can exhibit an average offset angle relative to the extrusion direction of between 30 and 60 degrees. In some embodiments, the fibers can exhibit an average offset angle relative to the extrusion direction of between 40 and 70 degrees.

In some embodiments, the fibers can be non-aligned throughout the extrudate. In other embodiments, portions of the extrudate that are farther away from a surface that has contacted the surface of an extrusion die during the extrusion process have a different fiber orientation. In some embodiments, the fibers exhibit an average offset angle relative to the extrusion direction of greater than 20, 25 or 30 degrees in a zone within 4, 2, 1.5, 1, or 0.5 millimeters of surface of the extrudate.

As described below, in some embodiments, compositions with fibers that are not oriented parallel to the direction of extrusion can be coextruded or otherwise combined to form articles with other compositions wherein the fibers are aligned with the direction of extrusion and/or with compositions lacking fibers. In such other compositions with aligned fibers, the fibers can exhibit an average offset angle relative to the extrusion direction of less than 30, 25, 20, 15, 10, or 5 degrees. In some embodiments, the fibers can exhibit an average offset angle relative to the extrusion direction of between 30 and 0 degrees. In some embodiments, the fibers can exhibit an average offset angle relative to the extrusion direction of between 20 and 0 degrees. In some embodiments, the fibers can exhibit an average offset angle relative to the extrusion direction of between 15 and 1 degrees. In some embodiments, the fibers can exhibit an average offset angle relative to the extrusion direction of between 10 and 1 degrees.

In some embodiments, including a first composition or portion with aligned fibers and a second composition or portion with non-aligned fibers, the fibers of the second composition can exhibit an average offset angle relative to the extrusion direction that is at least 5, 10, 15 or 20 degrees different than the average offset angle relative to the extrusion direction for the fibers of the first composition.

Particles

Descriptions herein of exemplary particles are only applicable for the description of embodiments herein and not for other patents or patent applications of the applicant and/or inventors unless explicitly stated to the contrary.

As described above, some compositions herein have a portion of particles resulting in non-aligned fiber orientation. Particles can include both organic and inorganic particles. Such particles can be roughly spherical, semi-spherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. In some embodiments, particles herein can have an aspect ratio of between about 10:1 and about 1:1. In some embodiments, particles herein can have an aspect ratio of between about 8:1 and about 1:1. In some embodiments, particles herein can have an aspect ratio of between about 7:1 and about 1:1. In some embodiments, particles herein can have an aspect ratio of between about 6:1 and about 1:1. In some embodiments, particles herein can have an aspect ratio of between about 5:1 and about 1:1. In some embodiments, particles herein can have an aspect ratio of between about 4:1 and about 1:1. In some embodiments, particles herein can have an aspect ratio of between about 3:1 and about 1:1. In some embodiments, particles herein can have an aspect ratio of between about 2:1 and about 1:1. Such aspect ratios can be assessed by first taking the largest dimension of the particle (major axis) and then comparing it with the next largest dimension of the particle that is perpendicular to the major axis.

In various embodiments, the particles can be, on average, from about 0.01 mm to about 8 mm in their largest dimension (or major axis or characteristic dimension). In various embodiments, the particles can be from about 0.25 mm to about 5 mm in their largest dimension. In various embodiments, the particles can have an average size of about 0.1 mm to about 2.5 mm in their largest dimension. In various embodiments, the particles can have an average size of about 0.18 mm to about 0.6 mm in their largest dimension. In various embodiments, the particles can have an average size of greater than about 0.6 mm in their largest dimension. For example, in various embodiments, the particles can have an average size of about 0.6 mm to about 3.0 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

In some embodiments, the particles can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, 3.0 mm, 3.5 mm, 4.0 mm, 4.5 mm, 5.0 mm, 5.5 mm, 6.0 mm, 6.5 mm, 7.0 mm, and 8.0 mm.

In some embodiments, the particles are organic particles and can have an average size of their largest dimension falling within a range wherein the lower bound and the upper bound can be any of the following sizes (provided that the upper bound is greater than the lower bound): 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

In some embodiments, the particles are inorganic particles and can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

As referenced above, aspect ratios can be assessed by first taking the largest dimension of the particle (major axis) and then comparing it with the next largest dimension of the particle along an axis (Y axis) that is perpendicular to the major axis (X axis). The depth or Z axis measure (Z axis) can be measured along an axis that is perpendicular to both the X and Y axes used to specify the aspect ratio. In some embodiments, particles herein can have an average or maximum depth or Z axis measure in the context of the aspect ratios described above that is equal to at least about 0.1, 0.2, 0.3, 0.4, 0.5, 0.6, 0.7, 0.8, 0.9, or 0.95 of the smaller of the two dimensions used to assess aspect ratio.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica, talc, and the like.

Particles herein can specifically include organic particles. Particles herein can specifically include particles comprising substantial portions of lignin and cellulose (lignocellulosic materials), such as wood particles or wood flour. Wood particles can be derived from hardwoods or softwoods. In various embodiments, the wood particles can have a moisture content of less than about 8, 6, 4, or 2 percent.

Particle sizes and distributions thereof can be described using sieve sizes. Standard U.S. sieve sizes and Tyler mesh sizes are shown in the table below with the corresponding opening size.

| U.S. Sieve Size | Tyler Mesh Size | Opening (mm) |
| --- | --- | --- |
| 10 | 9 | 2.00 |
| 12 | 10 | 1.68 |
| 14 | 12 | 1.41 |
| 16 | 14 | 1.19 |
| 18 | 16 | 1.00 |
| 20 | 20 | 0.841 |
| 25 | 24 | 0.707 |
| 30 | 28 | 0.595 |
| 35 | 32 | 0.500 |
| 40 | 35 | 0.420 |
| 45 | 42 | 0.354 |
| 50 | 48 | 0.297 |
| 60 | 60 | 0.250 |
| 70 | 65 | 0.210 |
| 80 | 80 | 0.177 |
| 100 | 100 | 0.149 |
| 120 | 115 | 0.125 |

In various embodiments, the wood particles can be a heterogeneous mixture of wood particles wherein at least about 50, 60, 70, 80, 90 or 95 weight percent of the particles are 80 Mesh or larger (or 80 sieve size—corresponding to a pore size of 0.177 mm and a particle size of approximately 0.180 mm).

In various embodiments, the wood particles can be a heterogeneous mixture of wood particles wherein at least about 50, 60, 70, 80, 90 or 95 weight percent of the particles are 80 Mesh or larger (or 80 sieve size—corresponding to a pore size of 0.177 mm and a particle size of approximately 0.180 mm) and less than 9 Mesh (or 10 sieve size—corresponding to a pore size of 2.00 mm).

In various embodiments, the wood particles can be a heterogeneous mixture of wood particles wherein at least about 50, 60, 70, 80, 90 or 95 weight percent of the particles are 28 Mesh or larger (or 30 sieve size—corresponding to a pore size of 0.595 mm and a particle size of approximately 0.6 mm).

In various embodiments, the wood particles can be a heterogeneous mixture of wood particles wherein at least about 50, 60, 70, 80, 90 or 95 weight percent of the particles are 28 Mesh or larger (or 30 sieve size—corresponding to a pore size of 0.595 mm and a particle size of approximately 0.6 mm) and less than 9 Mesh (or 10 sieve size—corresponding to a pore size of 2.00 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles. Also, the particles may be treated in various ways to improve adhesion to the polymeric materials, reduce moisture effects, or provide other useful properties.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition with non-aligned fibers can be greater than or equal to about 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition with non-aligned fibers can be less than or equal to about 80, 75, 70, 65, 60, 55, 50, 45, 40, 35, 30, 25, 20, 15, 10, or 5 weight percent. In some embodiments, the amount of particles can be in a range wherein each of the foregoing numbers and serve as the upper or lower bound of the range provided that the upper bound is larger than the lower bound.

The amount of particles in the extruded composition, as measured based on volume, can be greater than or equal to about 1, 2, 3, 4, 5, 6, 7, 8, 9, 10, 12, 14, 16, 18, 20, 22, 24, 26, 28, 30, 32, 34, or 36 percent of the total composition. In some embodiments, the amount of particles as measured based on volume can be in a range wherein any of the foregoing amounts can serve as the upper or lower bound of the range.

It will be appreciated that in some embodiments, some amount of out of specification particles can also be included. As such, in some embodiments, at least 50, 60, 70, 80, 90, 95, or 98 wt. % of the total particle content of the composition are those such the particles described above. For example, in some embodiments at least 50 wt. % of the particles are selected from the group consisting of organic particles having an average largest dimension of greater than 100 microns and an aspect ratio of 4:1 or less and inorganic particles having an average largest dimension of greater than 10 microns and an aspect ratio of 4:1 or less.

Fibers

Descriptions herein of exemplary fibers are only applicable for the description of embodiments herein and not for other patents or patent applications of the applicant and/or inventors unless explicitly stated to the contrary. Various embodiments of compositions and extrudates herein include a fiber component. The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites of the invention include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that typically fiber breakage occurs as a result of shear forces within the extruder. Therefore the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

In various embodiments, the particles can be substantially uniformly dispersed within a given extruded composition.

Polymer Resin

Polymer resins used with embodiments herein can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV—ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (DI/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). Immiscible or non-alloyed blend of polymers typically displays two or more glass transition temperatures associated with immiscible polymer phases.

Polymeric resin materials herein can retain sufficient thermoplastic properties to permit melt blending with fiber, permit formation of extruded articles or other extrudates such as pellets, and to permit the composition material or pellet to be extruded or injection molded in a thermoplastic process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated as least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide) and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book Poly(Lactic Acid) Synthesis, Structures, Properties, Processing, and Applications, Wiley Series on Polymer Engineering and Technology, 2010.

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F.

The polymer resin can make up the largest share of the extruded composition. In some embodiments, the polymer resin is at least about 20, 25, 30, 35, 40, 45, 50, 55, 60, 65, 70, 75, 80, 85, 90, 95, 98, or 99 wt. % of the extruded composition. In some embodiments, the amount of the polymer resin in the composition can be in a range wherein any of the foregoing numbers can serve as the upper or lower bound of the range, provide that the upper bound is larger than the lower bound.

Impact Modifiers

Embodiments herein can also include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, ethylene-n-butyl acrylate-carbon monoxide. Exemplary impact modifier copolymers can include those sold under the tradename ELVALOY, commercially available from DuPont.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to 25 phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to 20 phr. In some embodiments, the composition can include an amount of impact modifier of greater than or equal to 8 phr and less than or equal to 20 phr. In some embodiments, the composition can include an amount of impact modifier of greater than or equal to 10 phr and less than or equal to 20 phr.

Other Components

It will be appreciated that various other components can be extruded with compositions herein and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. %, based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

Methods

Methods herein can include various procedures. By way of example, methods can include one or more of mixing, compounding, gas removal, moisture removal, and final extrusion. Materials can be mixed using a variety of mixing means, including extruder mechanisms wherein the materials are mixed under conditions of high shear until the appropriate degree of wetting and intimate contact is achieved. In some embodiments, the moisture content can be controlled at a moisture removal station. By way of example, the heated composite is exposed to atmospheric pressure or reduced pressure at elevated temperature for a sufficient period of time to remove moisture resulting in a final desired moisture content. In some embodiments, the final moisture content is about 8 wt. % or less.

In some cases, inputs are fed directly, without a compounding step, into an extruder (including but not limited to single screw, double screw, co-rotating, counter-rotating or the like) that produces the final product, such as a profile extrusion. In other cases, the inputs can be first processed with a compounding extrusion step, wherein the inputs are mixed together and run through a compounding extruder which provides for high levels of mixing and interaction of components. While various extruders can be used for compounding, typically twin-screw extruders are used in either co-rotating or counter-rotating configurations. In some embodiments, a compounding operation can be referred to as a pelletizing operation as the output from the compounding operation is typically pellets.

The articles herein can be formed by known extrusion (including co-extrusion) techniques, pultrusion techniques, and the like. At its most basic level, extrusion is the process of producing continuous articles by forcing a material through a die. The extruded article can be of various shapes depending on the extrusion die geometry. In polymer extrusion, the material being forced through a die is a molten polymer.

Profile extrusion refers to the process of making continuous shapes by extrusion. The term "profile extrusion" also refers to the resultant article formed during the profile extrusion process. In certain embodiments, the article, which is particularly in the form of a building component, is in the form of a profile extrusion. In some embodiments, profile extrusion can exclude the formation of sheets.

In addition, a process called co-extrusion can be used herein and refers to a process whereby two or more polymeric materials, each extruded separately, are joined in a molten state in the die. In some applications, the co-extruded surface layer can be referred to as a capping layer or capstock. In some embodiments, compositions herein can be extruded in the form of a capping layer over non-thermoplastic materials such as wood, thermosets, or metal.

In some embodiments, compositions herein can be extruded in particular wall segments (internal or external) such that the placement provides reinforced strength or other benefits identified through Finite Element Analysis (FEA). By way of example, the composite material herein can be used in applications wherein the desirable strength is known through FEA modeling and applied only in those specific areas to enhance lineal performance or extruded specifically in a particular lineal within a unit assembly to enhance unit performance.

The articles herein can be in the form of a profile that has been formed by an extrusion process (referred to herein as a "profile extrusion"), including, in some embodiments, a co-extruded layer or capping material (e.g., over another material such as a wood window or door component). The articles herein can be in the form of an extruded article, a pultruded article, or a combination thereof.

One exemplary piece of equipment for mixing and extruding the compositions herein is an industrial extruder device. Such extruders can be obtained from a variety of manufacturers.

Figure 4:
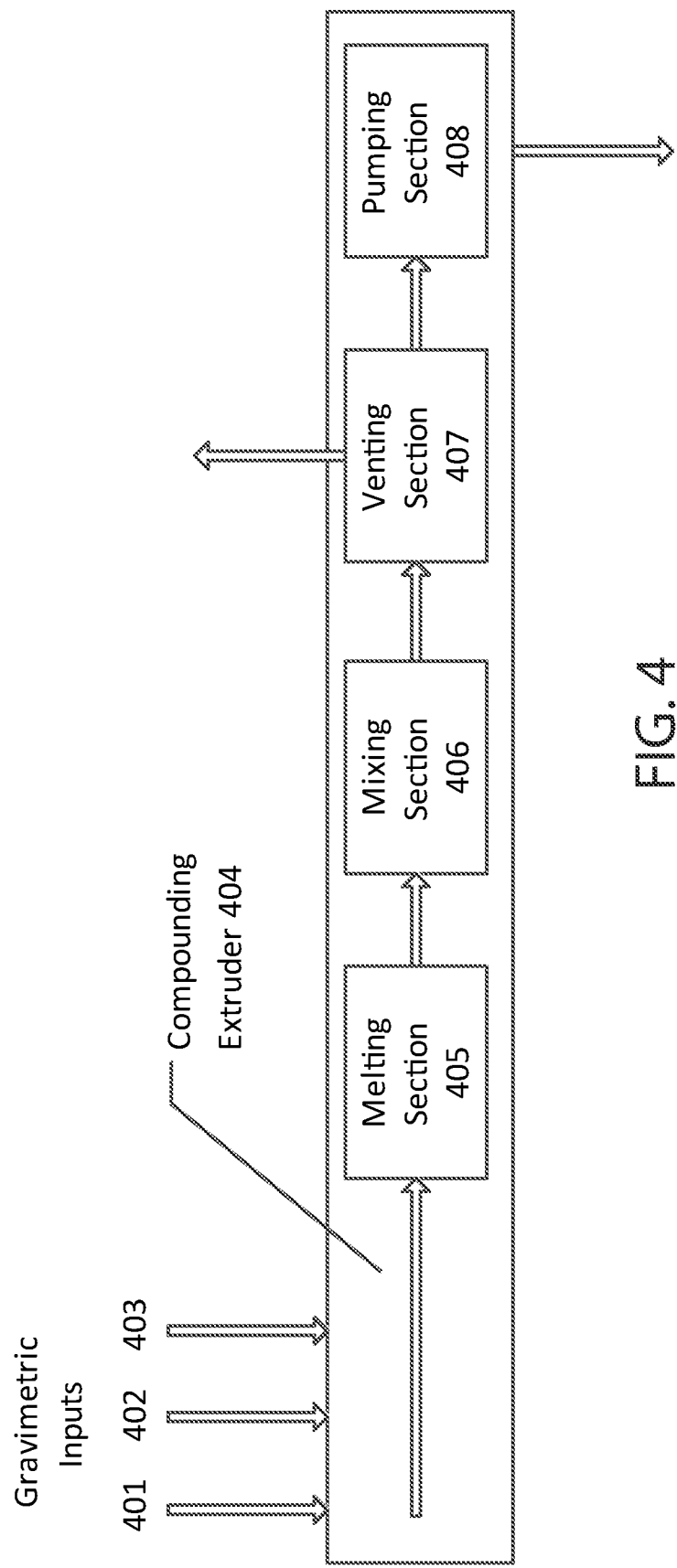
FIG. 4 is a schematic diagram of an exemplary compounding extruder system.

Referring now to FIG. 4, a diagram of an exemplary compounding extruder system 404 is shown. Particles, if used, fibers and polymer resin can be fed into compounding extruder 404 using a gravimetric metering feeder 401, 402, or 403 or other type of feeder. The compounding extruder can be run at various speeds and temperatures. In some embodiments, it can be run at 50-500 rpm and be heated to approximately 150 to 300 degrees Celsius. The particles, fibers and polymer resin can be heated to approximately 140 to 190 degrees Celsius as they pass through melting section 405, mixed at approximately 160 to 190 degrees Celsius as they pass through mixing section 406, and then water vapor and other off gases can be allowed to escape through venting section 407 at approximately 160 to 190 degrees Celsius.

The composite can be further compounded at pumping section 408 at approximately 155 to 195 degrees Celsius. The screw can compress the molten composite and feed it into a pelletizing die. The pelletizing die can produce small pellets of composite.

In some embodiments, a stranding method can be used for pelletizing. By way of example, material can be fed from a barrel section into a two-hole strand die. The strands can then be dropped into a chilled water bath, in some cases at approximately 8° C., to cool sufficiently to solidify. After exiting the water bath, the strands can be pulled through two air wipes to remove any water. Then the strands can then be pulled into a pelletizing strand cutter to create the final pellets.

Figure 5:
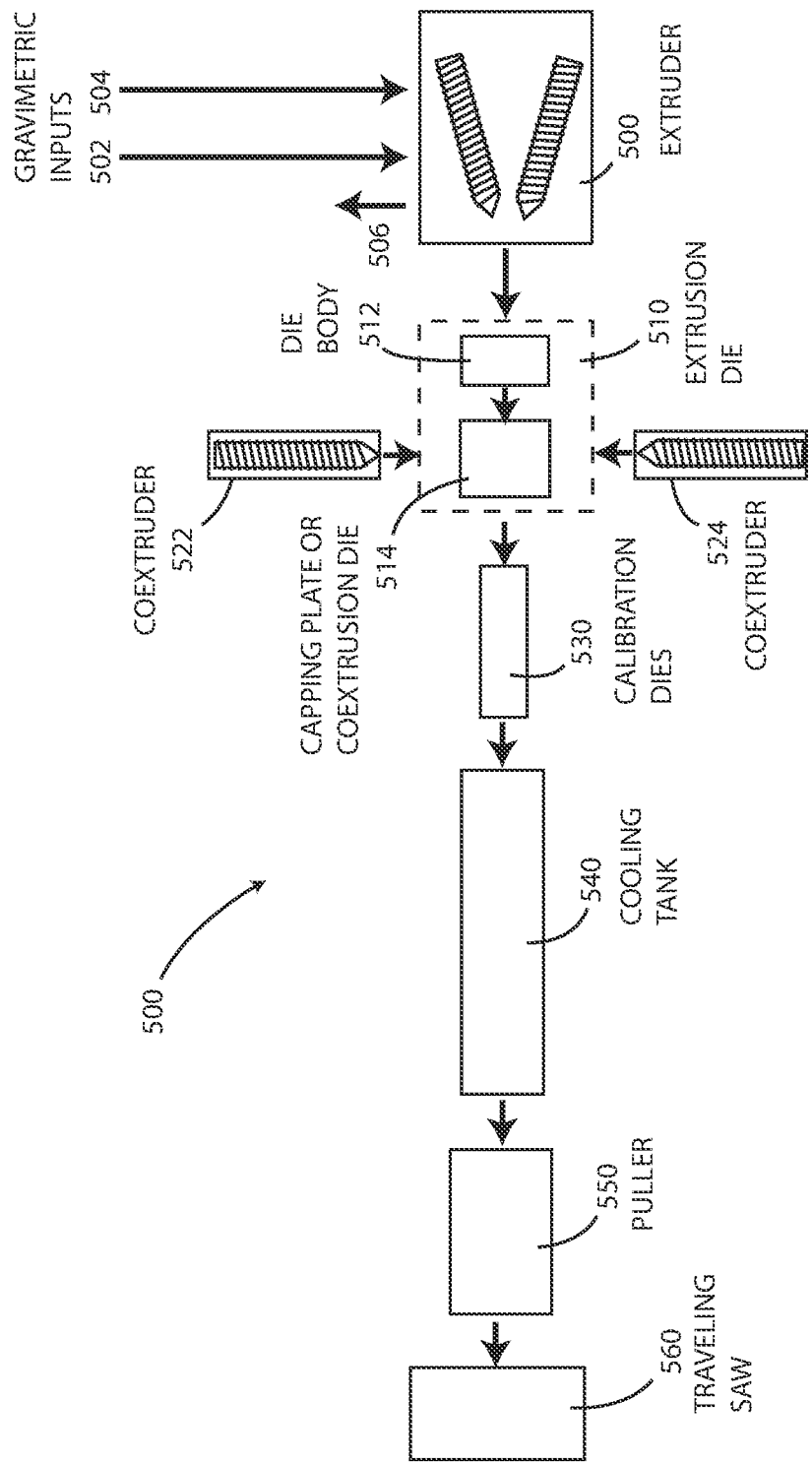
FIG. 5 is a schematic diagram of an exemplary extruder for producing extrudates herein.

Referring now to FIG. 5, a diagram of an exemplary extruder 500 for producing extrudates, such as profile extrusions is shown. Pellets produced in a compounding step, or materials not having been compounded, can be fed into an extruder to produce profile extrusions. The extruder 500 can be a conical or parallel twin screw extruder with gravimetric or volumetric feeders 502 and 504 for feeding both primary materials and additive and/or reclaimed materials to the extruder. The extruder 500 can be equipped with a vacuum port or vent 506 for controlled devolatilization of (removal of moisture from) the molten material. Heating and other temperature adjustments and controls conventional to extrusion equipment can be included.

An extrusion die 510 can be made up of a primary die body 512 and capping plate(s) or coextrusion die 514, which can be used to coextrude a second layer which could be placed within the internal cavities of or an outer or capping layer onto a base extrusion. Coextrusion die 514 can be fed by extruders 522 and 524, each of which can apply a different material or a capping material to two adjacent sides of the base extrusion. The coextruded capping material applied by extruders 522 and 524 can be the same or different. The option of coextruding a capping material or not coextruding a capping material can be selected by turning coextruders 522 and 524 on or off as needed.

The extruder 500 can further include a conventional calibration die 530 for applying a vacuum to size and maintain the desired final shape of the extruded member as the members began to cool. After calibration, the extruded member can pass through cooling tank 540, optionally aided by a puller 550, which can be a pair of sectioned belts of conventional design. Finally, the continuous extruded member can be cut into 4 foot lengths by traveling cut-off saw 560, also of conventional design, wherein the saw traveled with the extrusion while sawing, to allow continuous operation of the extruder during sawing.

In various specific embodiments, methods herein can include a method of making an extruded article. The method can include compounding materials as described herein including, but not limited to, a polymer resin, particles, and fibers into pellets. The method can further include extruding the pellets, with or without further additives, to form a first portion of an extruded article.

Included herein is also a method of making an extruded article including extruding a first composition, with or without previous compounding, to form the extruded article. The first composition can include a polymer resin, particles and fibers. In some embodiments, a method of making an extruded article can also include extruding a second composition, with or without previous compounding, to form the extruded article. The second composition can include a polymer resin and fibers, but lacking particles or including a lesser amount of particles.

The line speed of the extrusion can vary based on a number of factors. In some embodiments, the line speed is greater than or equal to 1, 2, 3, 4, 5, 10, 15, 20, 25, 30, 40 or 50 feet per minute. In some embodiments, the line speed is less than or equal to 150, 100, 75 or 50 feet per minute. In some embodiments, the line speed can fall in a range wherein any of the foregoing speeds can serve as the upper or lower bound of the range provided that the upper bound is larger than the lower bound.

Functional Properties

Extrudates in accordance with embodiments herein (including articles and specifically profile extrusions) can exhibit desirable properties in terms of impact resistance, strength, and the like.

In various embodiment, extrudates herein can exhibit a Gardner impact resistance of greater than 0.2 in*lb/mil. In some embodiments, extrudates herein can exhibit a Gardner impact resistance of greater than 0.4 in*lb/mil. Gardner impact can be assessed in accordance with ASTM D4226-09.

In various embodiments, extrudates herein can exhibit a Regular Izod Impact value of greater than 100, 150, 200, 250, 300, 350, 400, 450, 500, 550, 600, 650, 700, 750, 800, 850, 900, 950, or 1000 J/m. In some embodiments, the Regular Izod Impact value can be less than 3000 J/m. Regular Izod Impact value can be measured in accordance with ASTM D256.

In various embodiments, extrudates herein can exhibit a flexural modulus of greater than 500,000, 550,000, 600,000, 650,000, 700,000, 750,000, 800,000, 850,000, 900,000, 950,000, 1,000,000, 1,100,000, 1,200,000, 1,300,000, 1,400,000, or 1,500,000 PSI. In some embodiments, the flexural modulus can be less than 4,000,000 PSI. Flexural modulus can be measured in accordance with ASTM D790 (D790-15e2).

In various embodiments, extrudates herein can exhibit a flexural strain of greater than 0.001, 0.005, 0.01, 0.015, 0.02, 0.025, 0.03, 0.04, 0.06, 0.08, or 0.1 in/in. In some embodiments, the flexural strain can be less than or equal to 1 in/in. Flexural strain can be measured in accordance with ASTM D790 (D790-15e2).

In various embodiments, extrudates herein can exhibit a flexural yield strength of greater than 3,000, 5,000, 7,000, 9,000, 11,000 13,000, 15,000, 17,000, or 19,000 PSI. In some embodiments, the yield strength can be less than 40,000 PSI. Flexural yield strength can be measured in accordance with ASTM D790 (D790-15e2).

In various embodiments, extrudates herein can exhibit a tensile modulus of greater than 500,000, 550,000, 600,000, 650,000, 700,000, 750,000, 800,000, 850,000, 900,000, 950,000, or 1,000,000 PSI. In some embodiments, the tensile modulus can be less than 4,000,000 PSI. Tensile modulus can be measured in accordance with ASTM D638 (D638-14).

In various embodiments, extrudates herein can exhibit a max tensile strain of greater than 0.1, 0.5, 1.0, 1.5, 2.0, 2.5, 3.5, 4.0, 5.0, 7.0, or 10.0%. Max tensile strain can be measured in accordance with ASTM D638 (D638-14).

Articles

Compositions herein can be used for extrusion processes for forming articles including building components, such as structural and decorative members, including, but not limited to, those used in windows, doors, railings, decking, siding, flooring, fencing, trim and other building products. In particular embodiments, fenestration components, such as window and door components are included.

Embodiments of compositions herein can be used to manufacture structural extruded articles such as rails, jambs, frames, stiles, sills, tracks, stop and sash. Embodiments of compositions herein can be used to manufacture nonstructural extruded articles such as trim elements including grid, cove, bead, quarter round, and the like. Other components can include extenders, grilles, mull posts, panels and the like. In some embodiments, compositions herein can be used to manufacture capping materials for any of the foregoing elements. In some embodiments, the structural element is a rigid structural member. In some embodiments the structural element can be used as an insert placed within an extruded profile hollow during assembly for additional structural performance.

Figure 6:
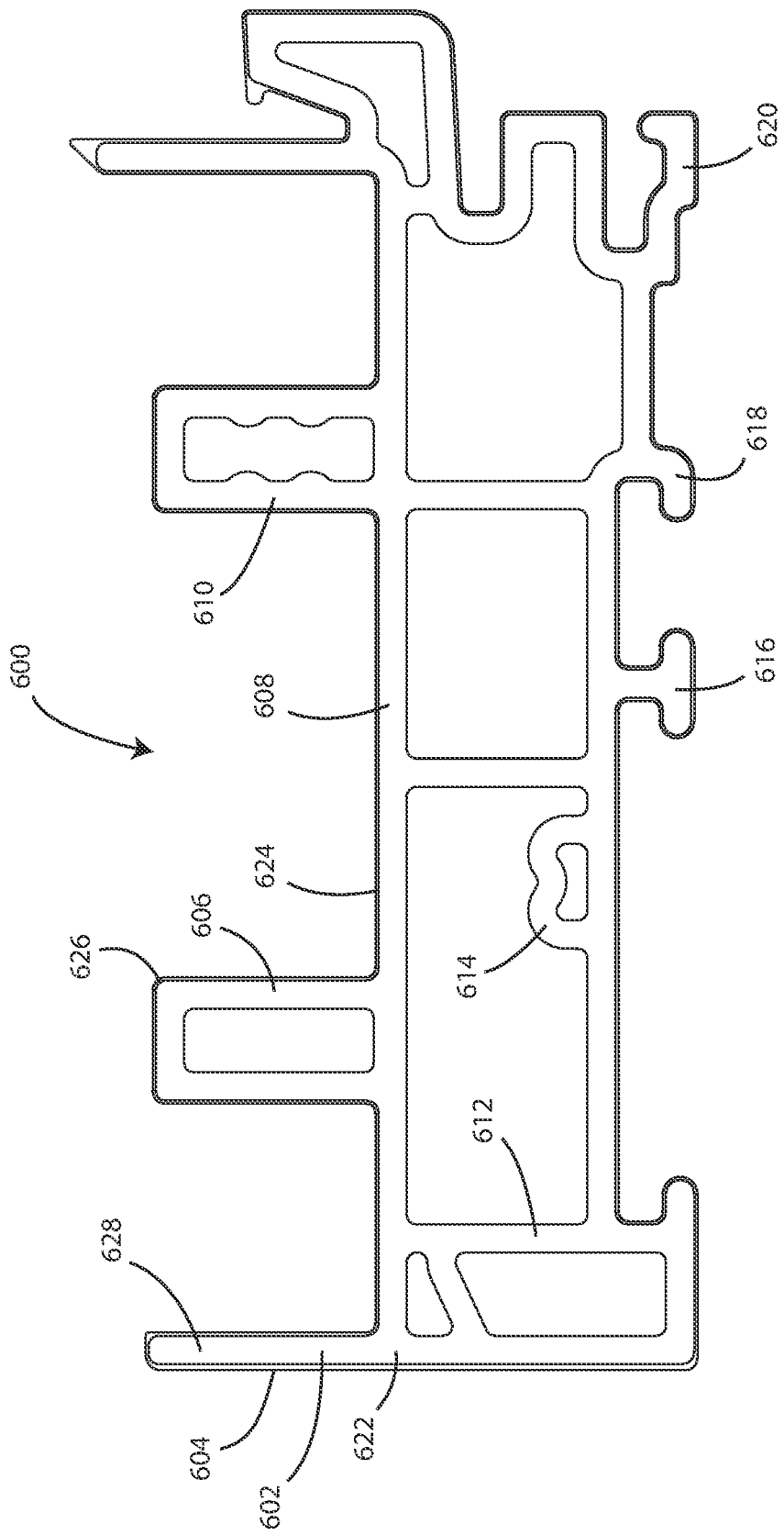
FIG. 6 is a cross-sectional view of a profile extrusion in accordance with various embodiments herein.

Referring now to FIG. 6, a cross-sectional view of a profile extrusion 600 is shown in accordance with various embodiments herein. The profile extrusion 600 can include a substrate 602 or base extrusion and a capstock or cap layer 604. In many embodiments, the substrate 602 and the cap layer 604 are formed from different compositions and coextruded together. It will be appreciated, however, that in some embodiments there is no cap layer 604. Alternatively, there can be more than two layers or portions of different materials forming articles herein.

Reference herein to a "first", "second", or "third" layer, portion or segment does not imply that one layer is physically beneath another or imply their position with respect to one another unless directly stated to. Rather, references to "first", "second" or "third" layers or portions are merely used to distinguish one layer, portion or composition from another.

Both the substrate 602 and the cap layer 604 can have various dimensions. In some embodiments, the cap layer 604 can be formed from a material that is relatively more expensive than the material of the substrate 602. As such, it can be economically desirable to minimize the thickness of the cap layer 604 while still keeping it thick enough to provide the intended properties.

In some embodiments, the cap layer can be from 0.001 inches to 0.15 inches (or 0.0254 mm to 3.81 mm). In some embodiments, the cap layer can be up to the full thickness of a wall. However, in some embodiments, the cap layer can be less than about 0.3, 0.25, 0.2, 0.15, 0.1, 0.05, or 0.025 inches thick (or 7.62, 6.35, 5.08, 3.81, 2.54, 1.27 or 0.635 mm respectively). In some embodiments, the cap layer is about 0.005 to about 0.02 inches thick (or 0.127 mm to 0.508 mm). In some embodiments, the cap layer is about 0.01 inches (or 0.254 mm) thick.

The profile extrusion 600 can include a number of different parts including internal walls 612 and 614, external walls 606, 608, and 610, and legs or single wall appendages 616, 618, and 620. In some embodiments, these different parts can be formed from the same composition. In other embodiments, these parts can be formed from different compositions. For example, some parts can be formed from compositions exhibiting substantially non-aligned fiber orientation and other parts can be formed from compositions exhibiting fiber orientation that is substantially parallel to the direction of extrusion.

Figure 7:
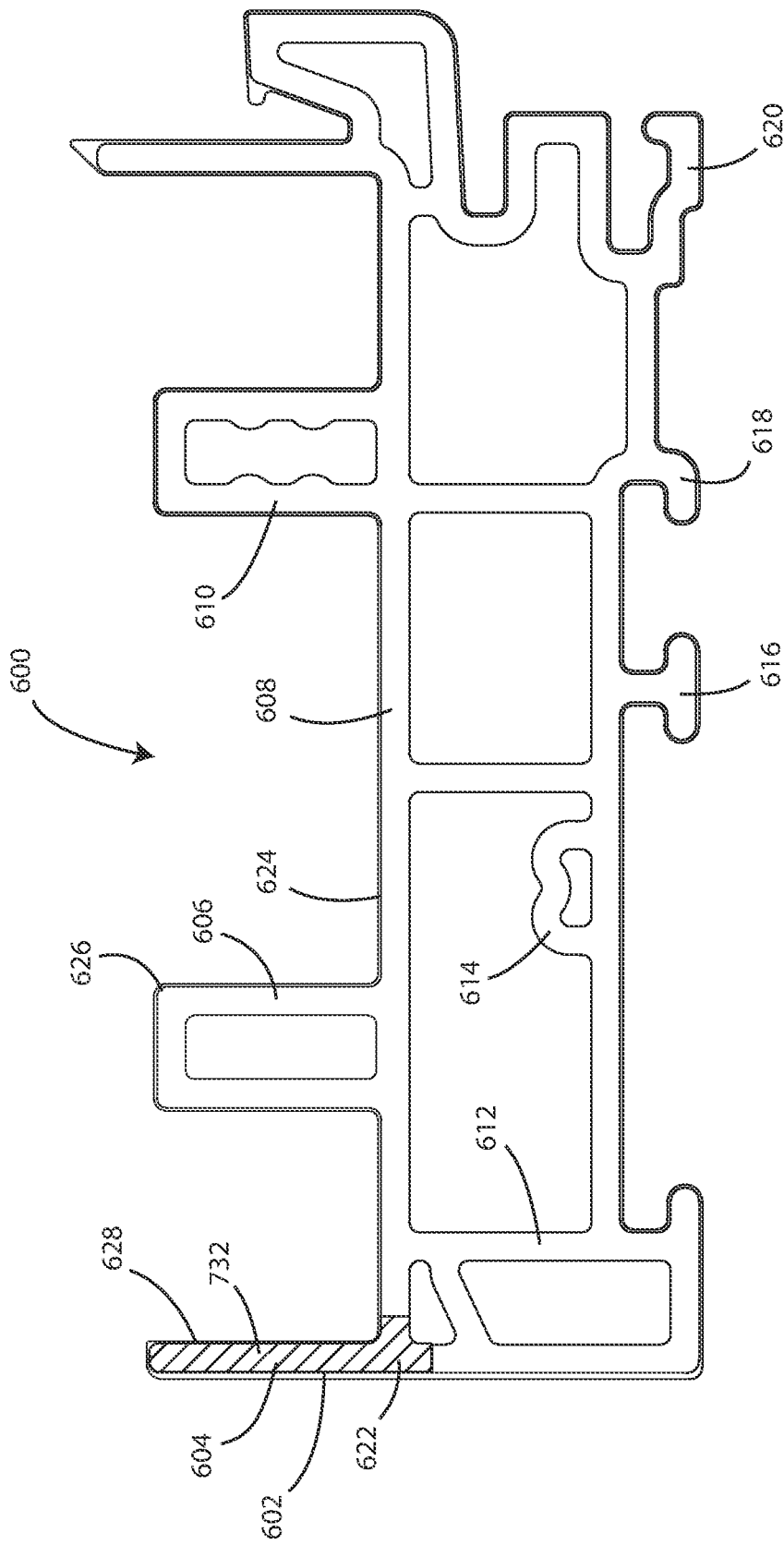
FIG. 7 is a cross-sectional view of a profile extrusion in accordance with various embodiments herein.

Referring now to FIG. 7, the profile extrusion 600 is shown wherein a single wall area 628 is formed from a composition 732 in accordance with various embodiments herein exhibiting substantially non-aligned fiber orientation. In addition, a joint 622 (such as where one wall meets another, in this case an external wall intersecting an external wall) can be formed from a composition 732 in accordance with various embodiments herein exhibiting substantially non-aligned fiber orientation. In some embodiments, only specific segments such as 626 and 628 (in the example of FIG. 7 or other segments previously referenced) are formed from the composition herein exhibiting substantially non-aligned fiber orientation while other portions are formed from other composites.

Figure 8:
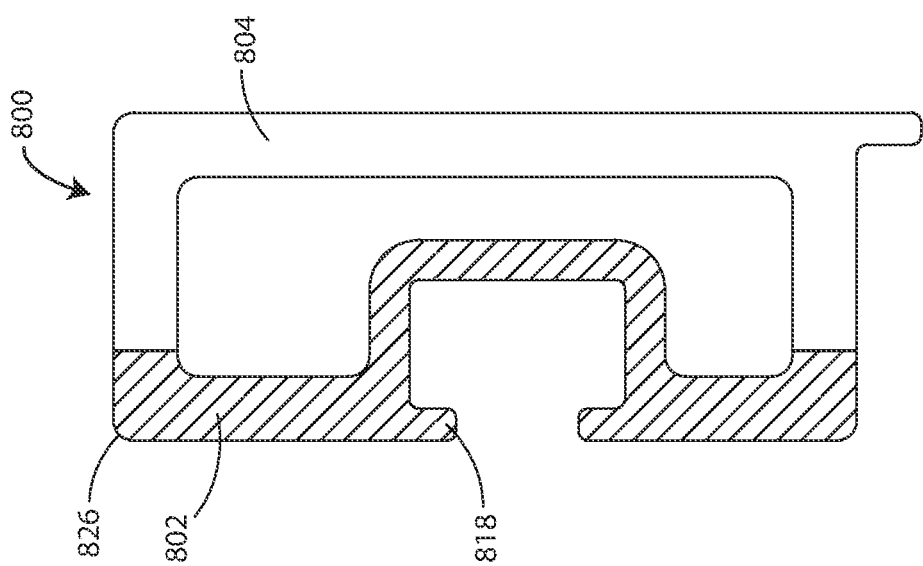
FIG. 8 is a cross-sectional view of a profile extrusion in accordance with various embodiments herein.

Referring now to FIG. 8, a profile extrusion 800 is shown in accordance with various embodiments herein. The profile extrusion 800 includes various structural features including, but not limited to, areas with a tight radius of curvature 826 (such as corners) and single wall appendages 818. The profile extrusion can include a first portion 802 formed from a first composition, such as those described herein having enhanced properties, and a second portion 804 formed from a second composition that is different than the first composition. In various embodiments, features such 826 and 818 can be formed with the first composition, while other features are formed from a different composition. However, it will be appreciated that in some embodiments all of the features can be formed with the first composition. In various embodiments, selected segments of the profile extrusion are formed from the first composition having enhanced properties.

Figure 9:
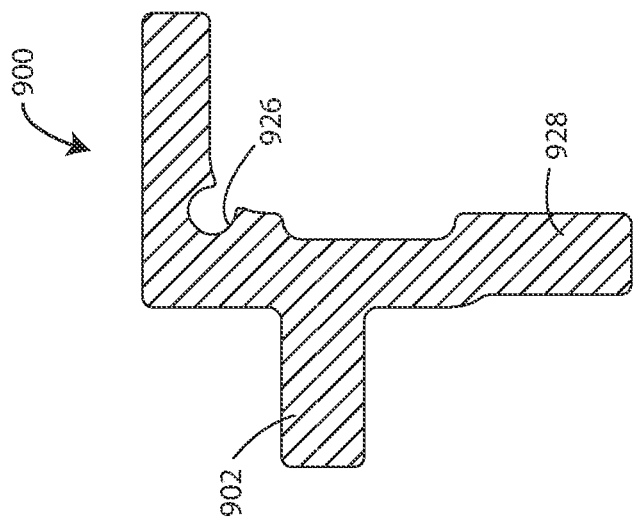
FIG. 9 is a cross-sectional view of a profile extrusion in accordance with various embodiments herein.

Referring now to FIG. 9, a profile extrusion 900 is shown in accordance with various embodiments herein. The profile extrusion 900 is an example of an insert, in that it would, in many cases, be designed to fit within a hollow portion of another extrusion. The profile extrusion 900 includes various structural features including, but not limited to, areas with a tight radius of curvature 926 (such as corners) and single wall portions 928. The profile extrusion 900 can be formed from a first composition 902.

Figure 10A:
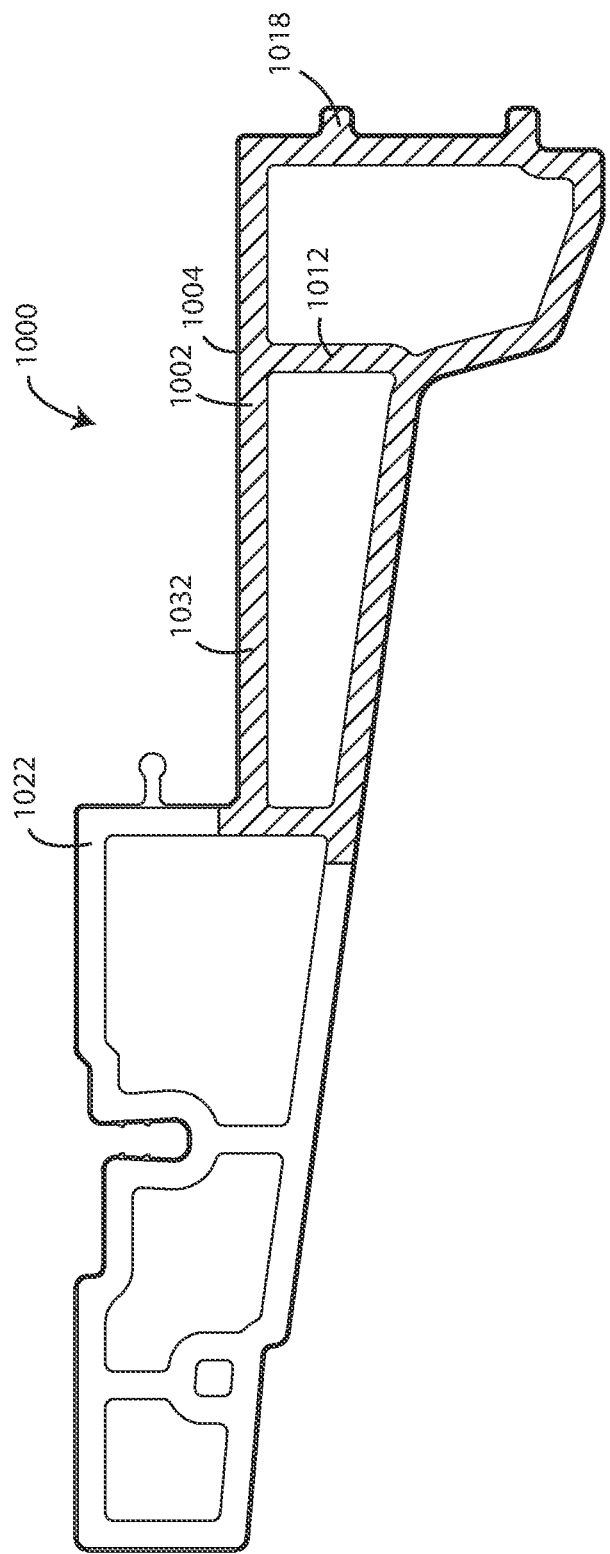
FIG. 10A is a cross-sectional view of a profile extrusion in accordance with various embodiments herein.

Referring now to FIG. 10A, a profile extrusion 1000 is shown in accordance with various embodiments herein. The profile extrusion 1000 includes various structural features including, but not limited to, areas such as single wall appendage 1018 and interior wall 1012. The profile extrusion can include a substrate 1002 and a cap layer 1004. The substrate 1002 can include a first portion 1032 formed from a first composition, such as those described herein having enhanced properties, and a second portion 1022 formed from a second composition that is different than the first composition.

Figure 10B:
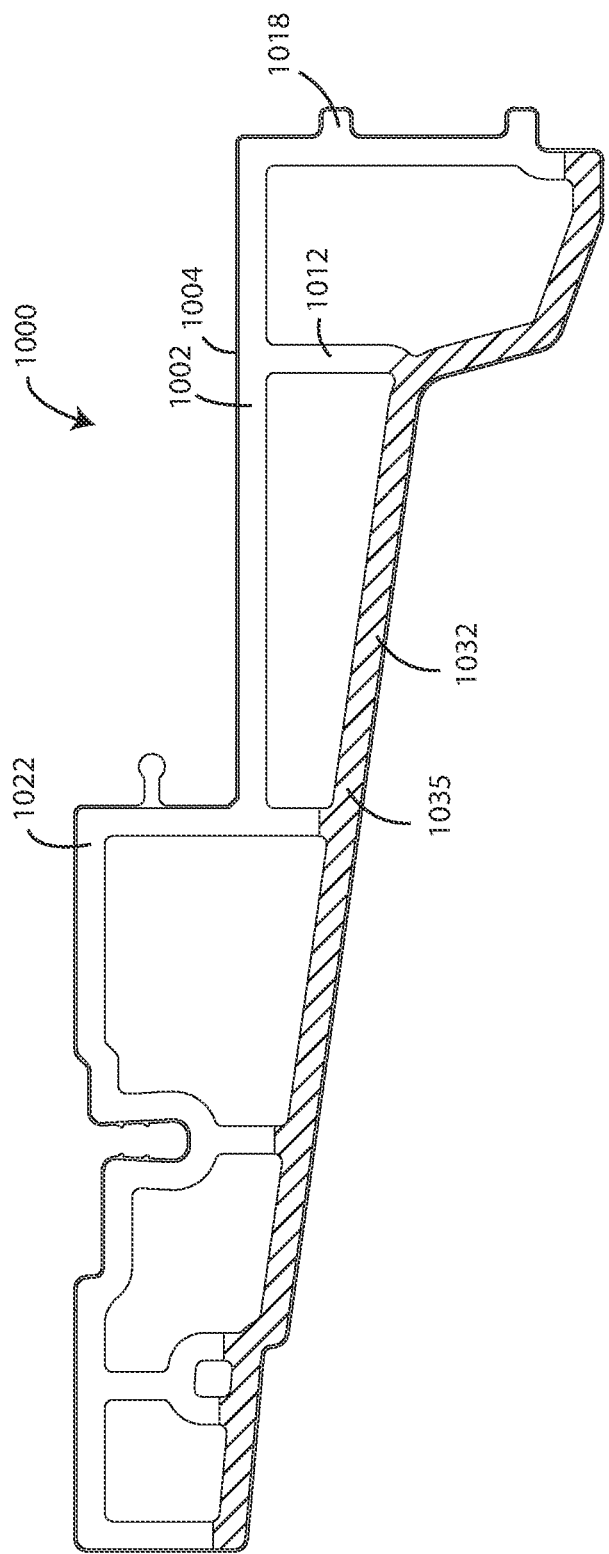
FIG. 10B is a cross-sectional view of a profile extrusion in accordance with various embodiments herein.

Referring now to FIG. 10B, a profile extrusion 1000 is shown in accordance with various embodiments herein. The profile extrusion 1000 includes various structural features including, but not limited to, areas such as single wall appendage 1018 and interior wall 1012. The profile extrusion 1000 can also specifically include a highly visible external wall 1035. The profile extrusion can include a substrate 1002 and a cap layer 1004. The substrate 1002 can include a first portion 1032 formed from a first composition, such as those described herein having enhanced properties, and a second portion 1022 formed from a second composition that is different than the first composition. Notably, the substrate of the highly visible external wall 1035 can be part of the first portion and be formed from the first composition.

Figure 11:
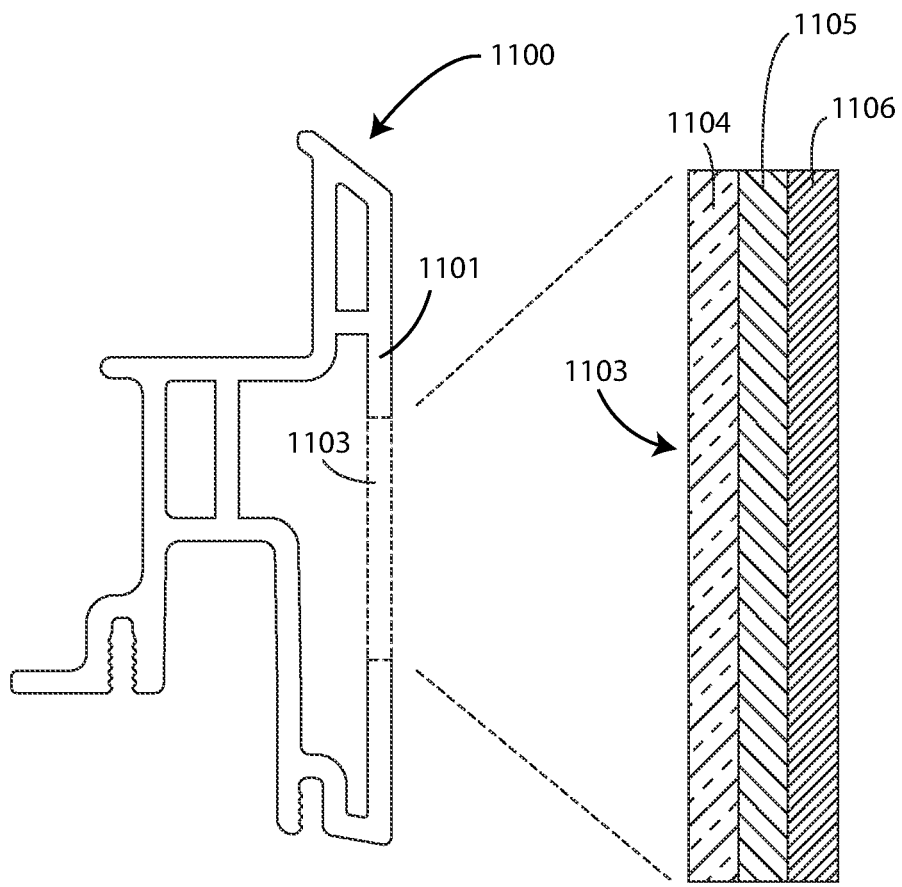
FIG. 11 is a cross-sectional view of a profile extrusion in accordance with various embodiments herein.

Beyond the use of compositions herein to form different segments or portions of the extrudate, such as illustrated with regard to FIGS. 7, 8, 10A, and 10B, it will be appreciated that compositions herein can be used to form layers that can be combined with layers formed from other compositions. Referring now to FIG. 11, a cross-sectional view of a profile extrusion 1100 is shown in accordance with various embodiments herein. The profile extrusion 1100 can include an external wall 1101. A portion 1103 of the external wall 1101 is shown expanded to illustrate its configuration of layers. In specific, the portion 1103 of external wall 1101 can include a substrate layer 1104, a layer with non-aligned fiber orientation layer 1105, and a capstock layer 1106. The substrate layer 1104 can be a lower cost substrate material. In various embodiments, the substrate layer 1104 can be, for example, a material including PVC and wood but lacking an impact modifier. The non-aligned fiber orientation layer 1105 can be formed from compositions described herein. The capstock layer 1106 can be a relatively thin layer exhibiting desirable properties for the surface of an extrudate. The capstock layer 1106 can be formed from materials such as PVC, acrylic, or other polymers, but substantially lacking particles as described herein or fibers as described herein.

Figure 12:
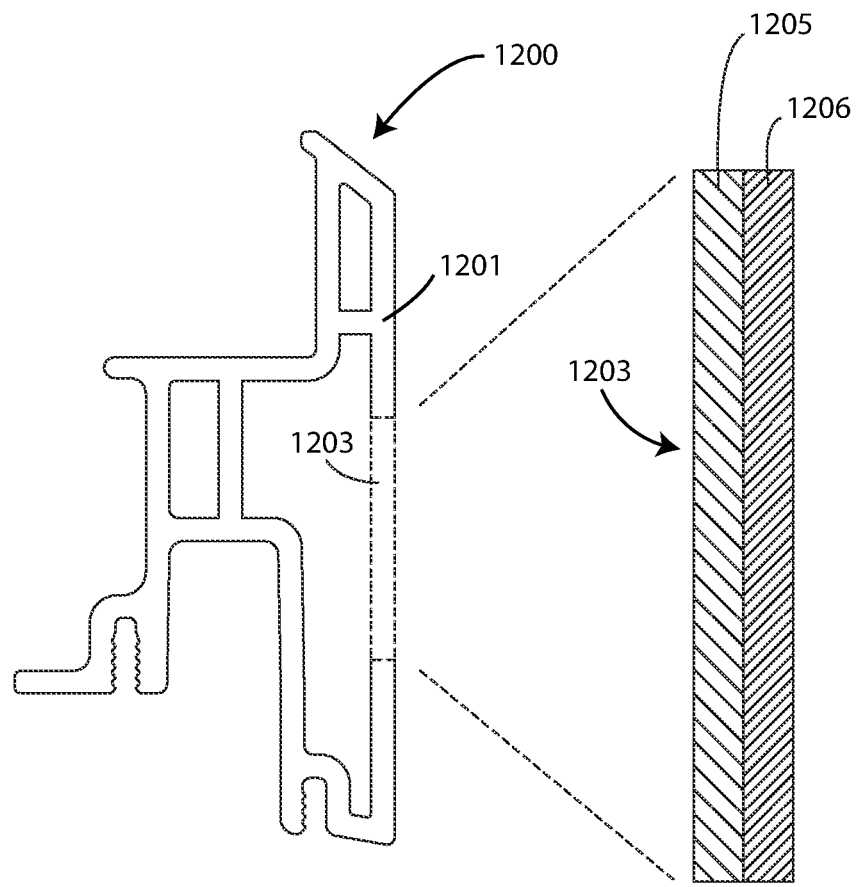
FIG. 12 is a cross-sectional view of a profile extrusion in accordance with various embodiments herein.
Figure 13:
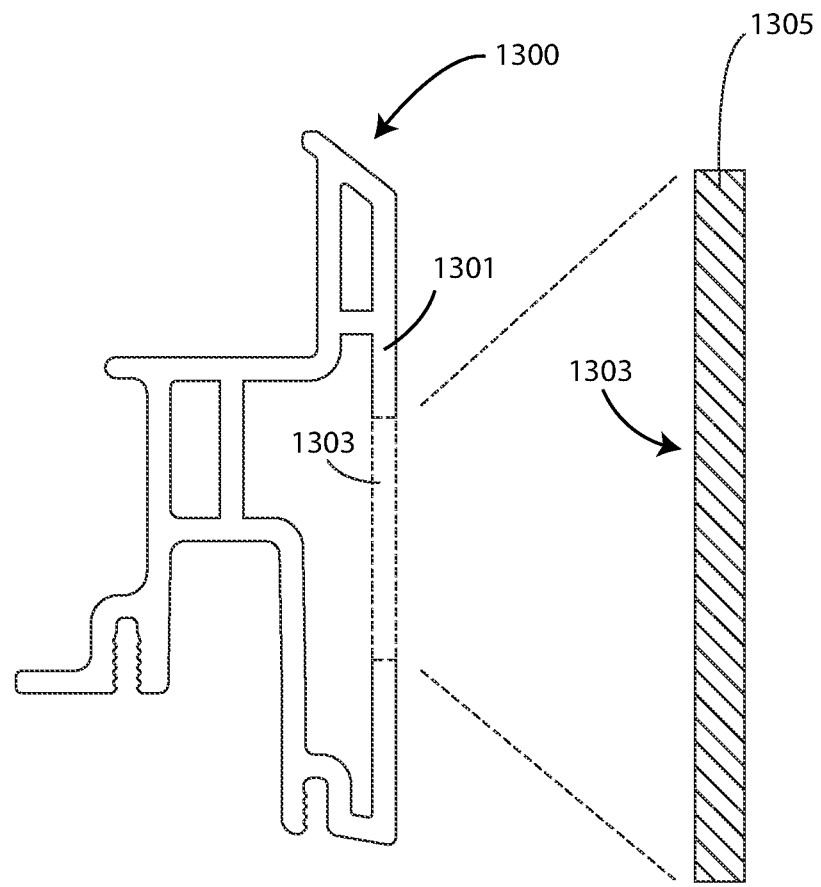
FIG. 13 is a cross-sectional view of a profile extrusion in accordance with various embodiments herein.

Referring now to FIG. 12, another cross-sectional view of a profile extrusion 1200 is shown in accordance with various embodiments herein. The profile extrusion 1200 can include an external wall 1201. A portion 1203 of the external wall 1201 is shown expanded to illustrate its configuration of layers. In specific, the portion 1203 of external wall 1201 can include a substrate layer 1205 and a capstock layer 1206. In this embodiment, the substrate layer 1205 can include materials as described herein exhibiting a substantially non-aligned fiber orientation. The capstock layer 1206 can be formed of the same materials as described with respect to capstock layer 1106 in FIG. 11.

Referring now to FIG. 12, another cross-sectional view of a profile extrusion 1200 is shown in accordance with various embodiments herein. The profile extrusion 1200 can include an external wall 1201. A portion 1203 of the external wall 1201 is shown expanded to illustrate its configuration of layers. In specific, the portion 1203 of external wall 1201 can include a substrate layer 1205. In this embodiment, the substrate layer 1205 can include materials as described herein exhibiting substantially non-aligned fiber orientation.

Aspects may be better understood with reference to the following examples. These examples are intended to be representative of specific embodiments, but are not intended as limiting the overall scope of embodiments herein.

EXAMPLES

Testing of extrudates in the following examples was conducted according to the following procedures:

Measurement of Fiber Orientation

Samples were ash-tested at 800 degrees Celsius for approximately 20 minutes. A Keyence VHX-2000 digital microscope was then used to measure 60 offset glass fiber angles (from the ash tested pellet's extrusion direction) for each sample. Note: a fiber aligned perfectly with the extrusion direction would measure a zero degree offset angle. Averages were noted along with standard deviations for the measurements.

Density

Density was measured using 60 gram samples of the pelletized material produced during compounding trials. Pellets were weighed and placed directly into an AccuPyc™ 1330 gas displacement pycnometer for density measurement. The gas used for testing was nitrogen.

Flexural Modulus

Flexural testing was performed according to ASTM D790-15e2 with the following modifications: samples used were of the size 1.0"×4.0"×0.125" (2.54 cm by 10.16 cm by 3.175 mm), support beams were spaced at a distance of 2" (5.08 cm) apart, and the crosshead speed for testing used was 0.5 in/min (12.7 mm/min). Specimens for testing were prepared by cutting samples directly from the extruded rectangular sample profiles. All testing was performed using an Instron 5500R tensile tester. Flexural modulus was calculated using the generated stress versus strain curve as outlined in ASTM D790-15e2.

Tensile Modulus

Tensile testing was performed according to ASTM D638-14 with the following modifications: samples used were of the size 1.0"×7.0"×0.125" (2.54 cm by 17.78 cm by 3.175 mm) and the crosshead speed for testing used was 0.05 in/min (1.27 mm/min).

Specimens for testing were prepared by cutting samples directly from the extruded rectangular sample profiles. All testing was performed using an MTS Criterion Model 45 Universal Testing Machine. Tensile modulus was calculated using the generated stress versus strain curve as outlined in ASTM D638-14.

Gardner Impact Resistance

Gardner impact testing was performed according to ASTM D4226-09, procedure B using an H.250 tup and 0.64" (16.256 mm) collet. Samples for testing were extruded rectangular sample profiles having dimensions of 4"×4'× 0.125" (10.16 cm by 1.2 m×17.78 cm by 3.175 mm). Each sample was impacted 20 times and data was analyzed according to Bruceton staircase methodology as outlined in ASTM D4226-09.

Components

TABLE 1

| Components | Identity | Specific Properties | Product ID | Supplier |
|---|---|---|---|---|
| Resin | PVC | Inherent Viscosity 0.88-0.92 | 225G PVC | Oxy |

TABLE 1-continued

| Components | Identity | Specific Properties | Product ID | Supplier |
|---|---|---|---|---|
| Fibers | Chopped Glass Fiber | Average Diameter = 14 micron; Average Length 4 mm (pre-extrusion); Aspect Ratio = 286:1 | 415A-14C | Owens-Corning |
| Impact Modifier | Acrylic Impact Modifier | | KM-X100 | Dow Chemical |
| Stabilizer | Tin Stabilizer | | TM-182 | Rohm & Haas |
| Particles | Acicular Particles | | Wollastonite 1515U | Fibertec |
| | Acicular Particles | | Wollastonite 905U | Fibertec |
| | Mica Particles (Flake-Like) | | Mica HR10 | Kish Company |
| | Mica Particles (Flake-Like) | | MicaFort PD200 | LKAB Minerals |
| | Mica Particles (Flake-Like) | | MicaFort PW30 | LKAB Minerals |
| | Talc Particles (Plate-Like) | | Talc Cimtuff 9110 | Cimbar |
| | Small Wood Particles | Characteristic Dimension = <180 Microns | | Andersen Corporation |
| | Medium Wood Particles | Characteristic Dimension = 180-600 Microns | | Andersen Corporation |
| | Large Wood Particles | Characteristic Dimension = >600 Microns | | Andersen Corporation |
| | Glass Bubbles | Characteristic Dimension = 20 Microns | iM16K | 3M |
| | Glass Bubbles | Characteristic Dimension = 40 Microns | S38HS | 3M |
| | Glass Beads | Characteristic Dimension = <44 Microns | Glass Beads K-Lite 7 | Kish Company |
| Process Aids | Calcium Stearate | | Calcium Stearate F | Witco |
| | Ester Blend in Paraffin Wax | | XL623 | Amerilubes |

PVC Component Blends:

The examples below utilized PVC component blends with the following components.

TABLE 2

PVC Component 1 (PVC 1)

| Component | Wt. % | PHR | Product |
|---|---|---|---|
| Resin | 96.4% | 100 | Oxy Vinyl 225G Polyvinyl Chloride Resin (225G PVC) |
| Calcium Stearate | 1.2% | 1.2 | Witco Calcium Stearate F |
| Specialty Lubricant | 1.4% | 1.5 | AmeriLubes XL623 Ester Blend in Paraffin Wax |
| Thermal Stabilizer | 1.0% | 1 | Rohm and Haas KM-X100 |

PVC Formulation Types:

The examples below utilized mixtures of the PVC component blend with particles and fibers in the amounts shown below in Table 3.

TABLE 3

| Formulation Type | PVC Blend Type | PVC Blend Wt. % | Particles Wt. % | Fiber Wt. % |
|---|---|---|---|---|
| 1 | PVC 1 | 95 | 0 | 5 |
| 2 | PVC 1 | 90 | 0 | 10 |
| 3 | PVC 1 | 85 | 0 | 15 |
| 4 | PVC 1 | 80 | 0 | 20 |
| 5 | PVC 1 | 70 | 0 | 30 |
| 6 | PVC 1 | 85 | 5 | 10 |
| 7 | PVC 1 | 80 | 10 | 10 |
| 8 | PVC 1 | 75 | 5 | 20 |
| 9 | PVC 1 | 70 | 10 | 20 |
| 10 | PVC 1 | 65 | 5 | 30 |
| 11 | PVC 1 | 60 | 10 | 30 |

Extrusion of Samples

Unless otherwise stated below, the materials used to form the test compositions were first compounded using a compounding apparatus similar to as shown in FIG. 4. In specific, particles (if used), fibers and polymer resin were fed into a compounding extruder using gravimetric metering feeders. The compounding extruder was run at 300 rpm and be heated to approximately 140-190 degrees Celsius. The particles (if used), fibers and polymer resin were heated to approximately 140-180 degrees Celsius as they passed through the melting section, mixed as they passed through the mixing section, and then water vapor and other off gases were allowed to escape through a venting section at approximately 160-180 degrees Celsius.

The composite was further compounded at a pumping section at approximately 170-190 degrees Celsius. The composite was fed into a single screw pelletizing die producing small pellets of composite.

Example 1: Fiber Orientation of Extrudates with Acicular Particles

In this example, acicular particles were used as the particles. The test substrates were extruded with a single screw pelletizing die. Fiber alignment was measured according to the procedure described above.

Figure 14:
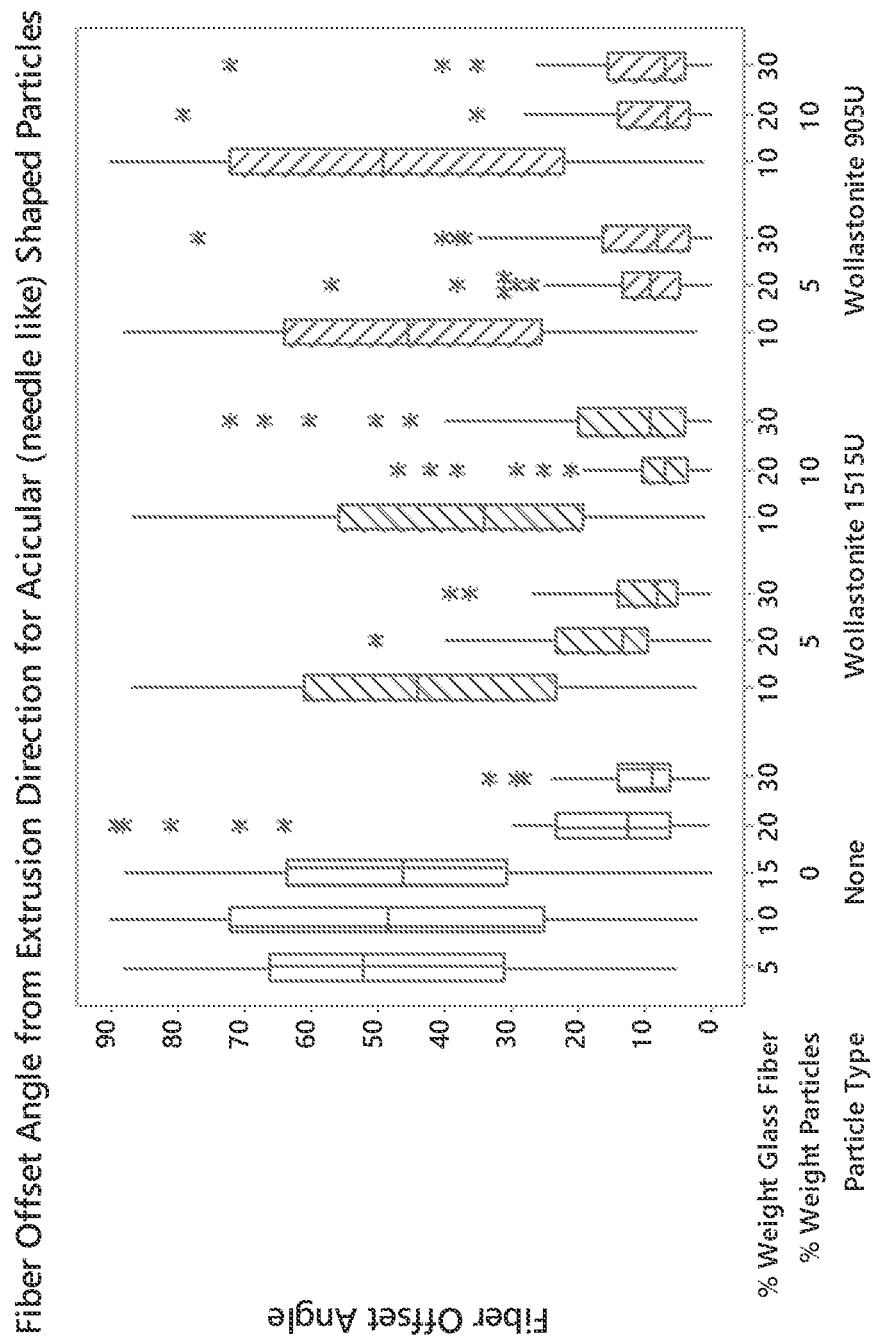
FIG. 14 is a box plot chart showing the orientation of fibers in experimental samples with acicular particles.

The data are shown in Table 4 and FIG. 14.

TABLE 4

| Formulation Type | Particle Type | Average Offset Angle (Degrees) | Standard Deviation (Degrees) |
|---|---|---|---|
| 1 | None | 49.6 | 22.4 |
| 2 | None | 48.4 | 26.7 |
| 3 | None | 45.7 | 25.9 |
| 4 | None | 18.4 | 20.3 |

TABLE 4-continued

| Formulation Type | Particle Type | Average Offset Angle (Degrees) | Standard Deviation (Degrees) |
|---|---|---|---|
| 5 | None | 10.7 | 7.3 |
| 6 | Wollastonite 1515U | 42.6 | 23.2 |
| 7 | Wollastonite 1515U | 37.0 | 22.1 |
| 8 | Wollastonite 1515U | 16.2 | 11.2 |
| 9 | Wollastonite 1515U | 9.5 | 9.7 |
| 10 | Wollastonite 1515U | 9.9 | 7.8 |
| 11 | Wollastonite 1515U | 15.2 | 16.5 |
| 6 | Wollastonite 905U | 45.2 | 24.0 |
| 7 | Wollastonite 905U | 47.3 | 27.5 |
| 8 | Wollastonite 905U | 10.9 | 10.4 |
| 9 | Wollastonite 905U | 10.3 | 11.8 |
| 10 | Wollastonite 905U | 12.3 | 13.7 |
| 11 | Wollastonite 905U | 10.6 | 11.6 |

Example 2: Fiber Orientation of Extrudates with Flake-Like/Plate-Like Particles

In this example, wood particles of various sizes were used as the particles. The test substrates were extruded with a single screw pelletizing die. Fiber alignment was measured according to the procedure described above.

Figure 15:
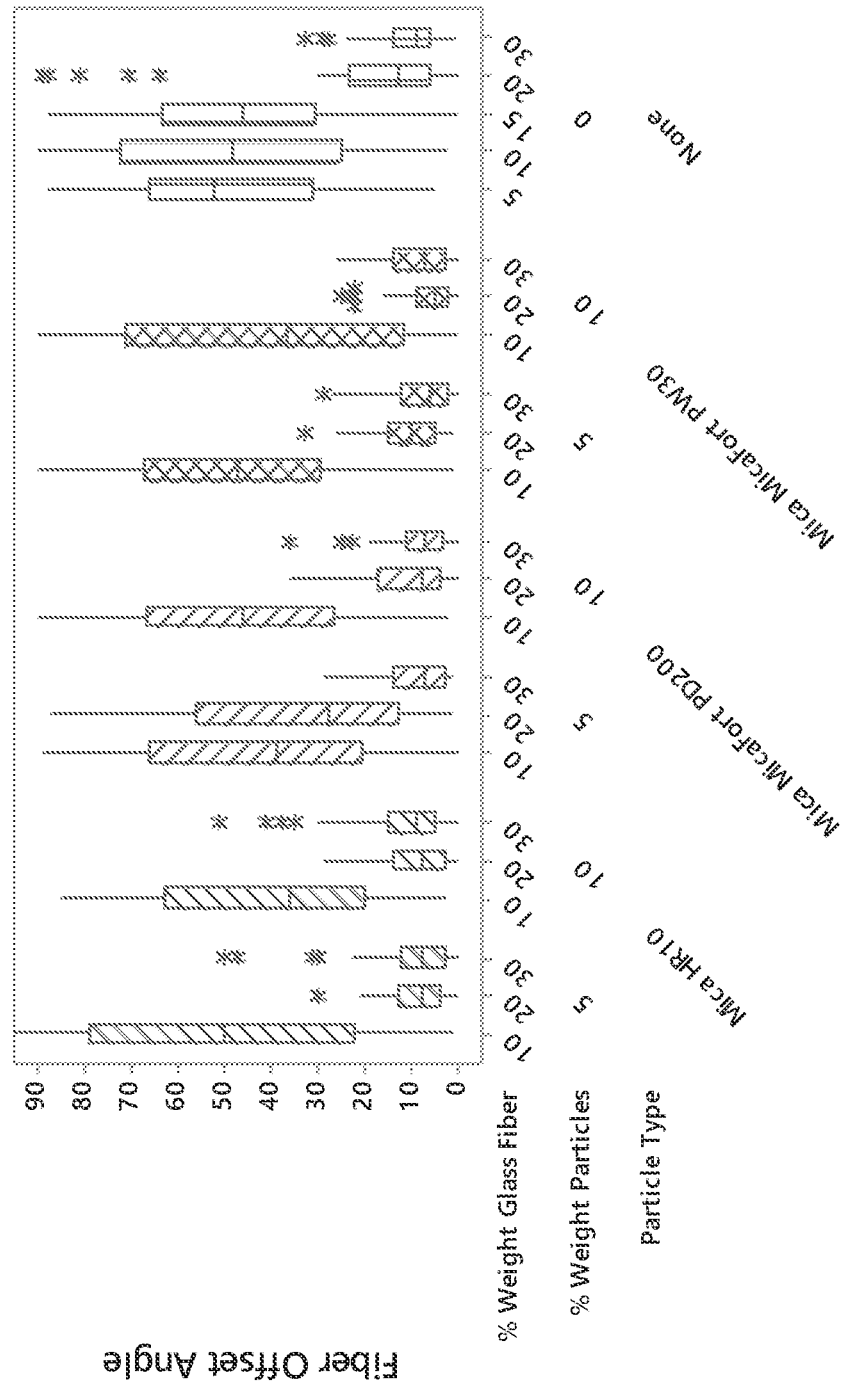
FIG. 15 is a box plot chart showing the orientation of fibers in experimental samples with mica particles.
Figure 16:
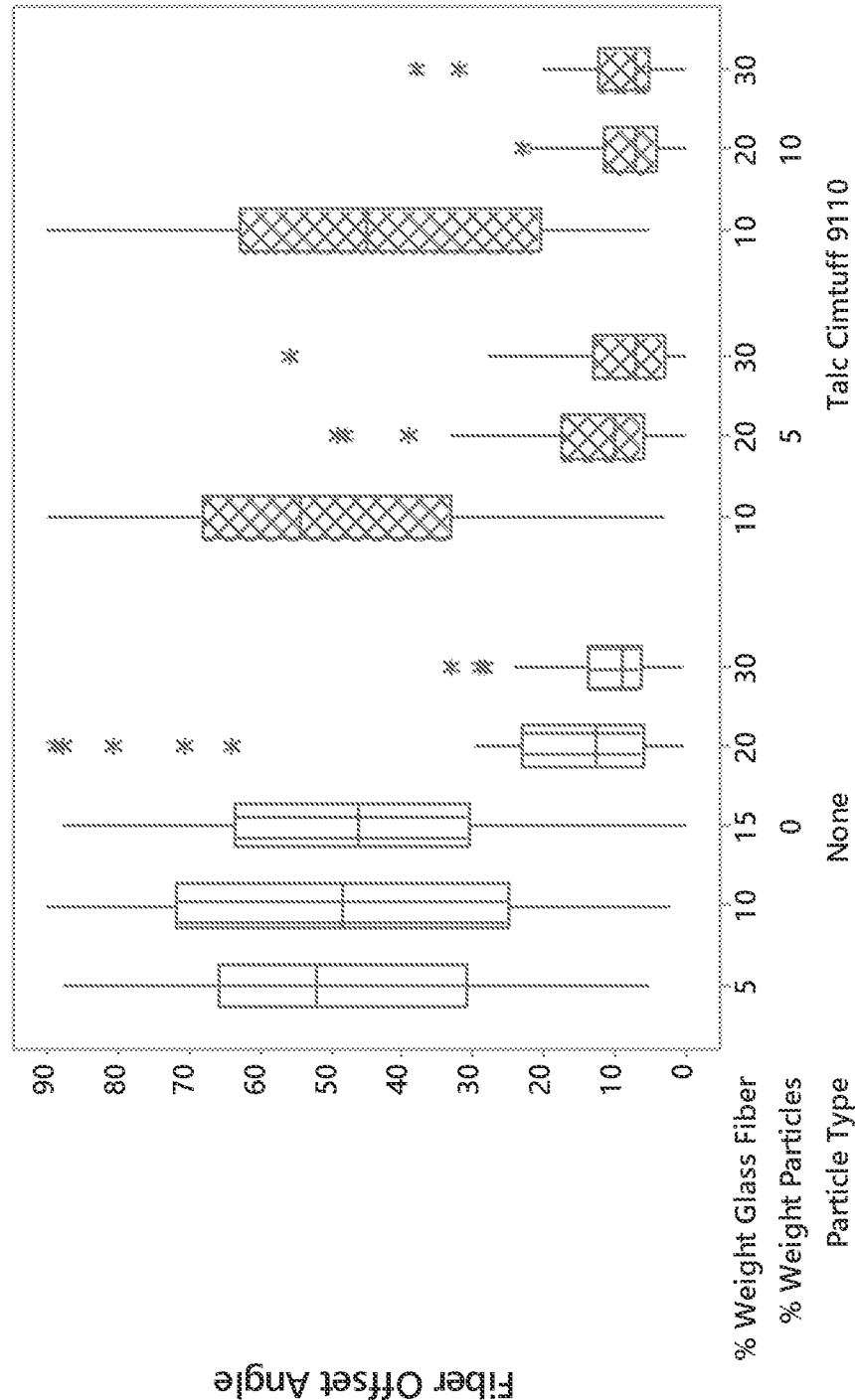
FIG. 16 is a box plot chart showing the orientation of fibers in experimental samples with talc particles.

The data are shown in Table 5 and FIGS. 15-16.

TABLE 5

| Formulation Type | Particle Type | Average Offset Angle (Degrees) | Standard Deviation (Degrees) |
|---|---|---|---|
| 1 | None | 49.6 | 22.4 |
| 2 | None | 48.4 | 26.7 |
| 3 | None | 45.7 | 25.9 |
| 4 | None | 18.4 | 20.3 |
| 5 | None | 10.7 | 7.3 |
| 6 | Mica HR10 | 48.0 | 29.3 |
| 7 | Mica HR10 | 41.1 | 23.3 |
| 8 | Mica HR10 | 10.0 | 13.1 |
| 9 | Mica HR10 | 8.4 | 6.1 |
| 10 | Mica HR10 | 9.7 | 9.9 |
| 11 | Mica HR10 | 11.9 | 10.2 |
| 6 | MicaFort PD200 | 40.8 | 25.8 |
| 7 | MicaFort PD200 | 44.6 | 24.6 |
| 8 | MicaFort PD200 | 34.3 | 24.9 |
| 9 | MicaFort PD200 | 10.9 | 8.8 |
| 10 | MicaFort PD200 | 9.1 | 7.1 |
| 11 | MicaFort PD200 | 8.4 | 6.6 |
| 6 | MicaFort PW30 | 47.7 | 25.0 |
| 7 | MicaFort PW30 | 39.5 | 29.6 |
| 8 | MicaFort PW30 | 10.4 | 7.0 |
| 9 | MicaFort PW30 | 6.6 | 6.2 |
| 10 | MicaFort PW30 | 8.4 | 7.2 |
| 11 | MicaFort PW30 | 9.2 | 7.5 |
| 6 | Talc Cimtuff 9110 | 49.5 | 24.9 |
| 7 | Talc Cimtuff 9110 | 43.4 | 24.9 |
| 8 | Talc Cimtuff 9110 | 13.0 | 11.1 |
| 9 | Talc Cimtuff 9110 | 8.3 | 5.4 |
| 10 | Talc Cimtuff 9110 | 9.2 | 9.2 |
| 11 | Talc Cimtuff 9110 | 8.9 | 6.7 |

Example 3: Fiber Orientation of Extrudates with Wood Particles

In this example, wood particles of various sizes were used as the particles. The test substrates were extruded with a single screw pelletizing die. Fiber alignment was measured according to the procedure described above.

Figure 17:
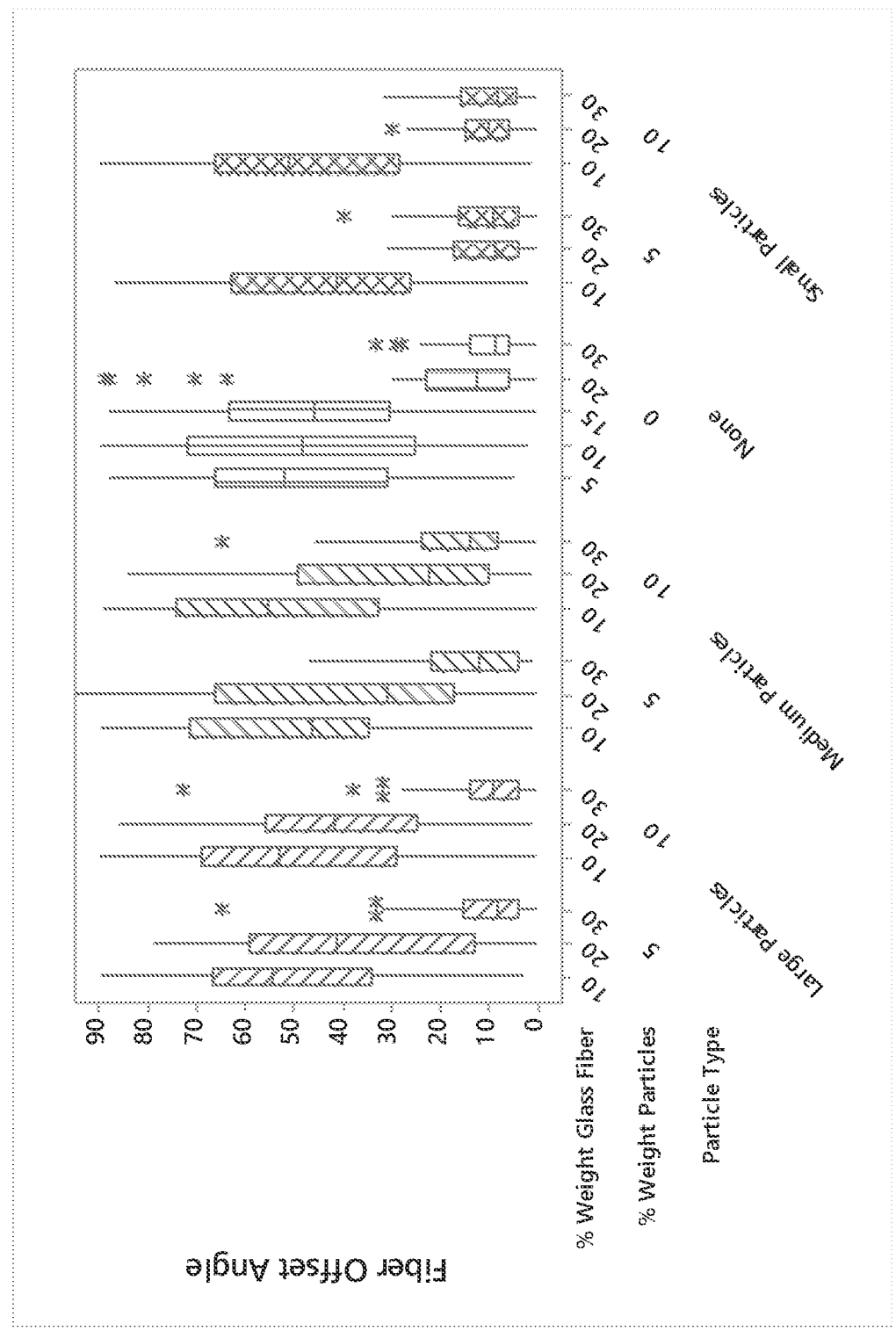
FIG. 17 is a box plot chart showing the orientation of fibers in experimental samples with wood particles.
Figure 18:
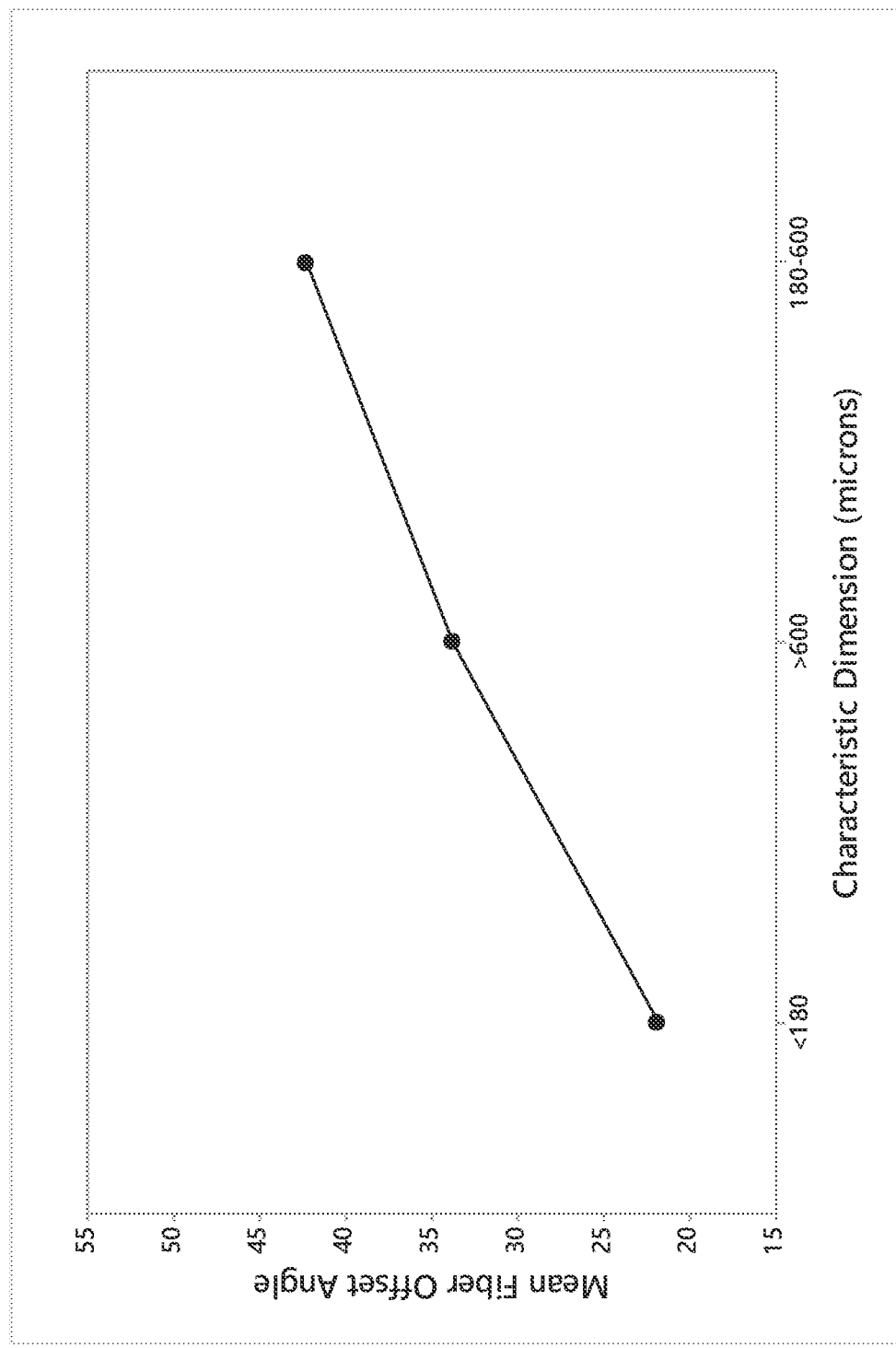
FIG. 18 is a chart showing the performance of wood particles as a function of different characteristic sizes across all glass fiber loading levels tested.

The data are shown in Table 6 and FIG. 17. As shown in FIG. 18, the medium wood particles and large wood particles appeared to outperform the small wood particles in causing non-alignment of fibers (FIG. 18 shows data at each characteristic size aggregated across different glass fiber loading levels).

TABLE 6

| Formulation Type | Particle Type | Average Offset Angle (Degrees) | Standard Deviation (Degrees) |
|---|---|---|---|
| 1 | None | 49.6 | 22.4 |
| 2 | None | 48.4 | 26.7 |
| 3 | None | 45.7 | 25.9 |
| 4 | None | 18.4 | 20.3 |
| 5 | None | 10.7 | 7.3 |
| 6 | Small Wood Particles | 43.0 | 22.5 |
| 7 | Small Wood Particles | 46.6 | 25.5 |
| 8 | Small Wood Particles | 10.6 | 8.0 |
| 9 | Small Wood Particles | 10.7 | 7.2 |
| 10 | Small Wood Particles | 11.0 | 8.9 |
| 11 | Small Wood Particles | 10.6 | 7.9 |
| 6 | Medium Wood Particles | 49.6 | 24.2 |
| 7 | Medium Wood Particles | 48.4 | 27.0 |
| 8 | Medium Wood Particles | 40.0 | 28.6 |
| 9 | Medium Wood Particles | 13.6 | 12.5 |
| 10 | Medium Wood Particles | 14.0 | 10.6 |
| 11 | Medium Wood Particles | 18.7 | 19.3 |
| 6 | Large Wood Particles | 50.9 | 23.3 |
| 7 | Large Wood Particles | 49.3 | 26.7 |
| 8 | Large Wood Particles | 37.6 | 24.3 |
| 9 | Large Wood Particles | 40.4 | 21.9 |
| 10 | Large Wood Particles | 11.1 | 11.2 |
| 11 | Large Wood Particles | 14.5 | 18.7 |

Example 4: Fiber Orientation of Extrudates with Glass Beads/Bubbles

In this example, glass beads/bubbles were used as the particles. The test substrates were extruded with a single screw pelletizing die. Fiber alignment was measured according to the procedure described above.

Figure 19:
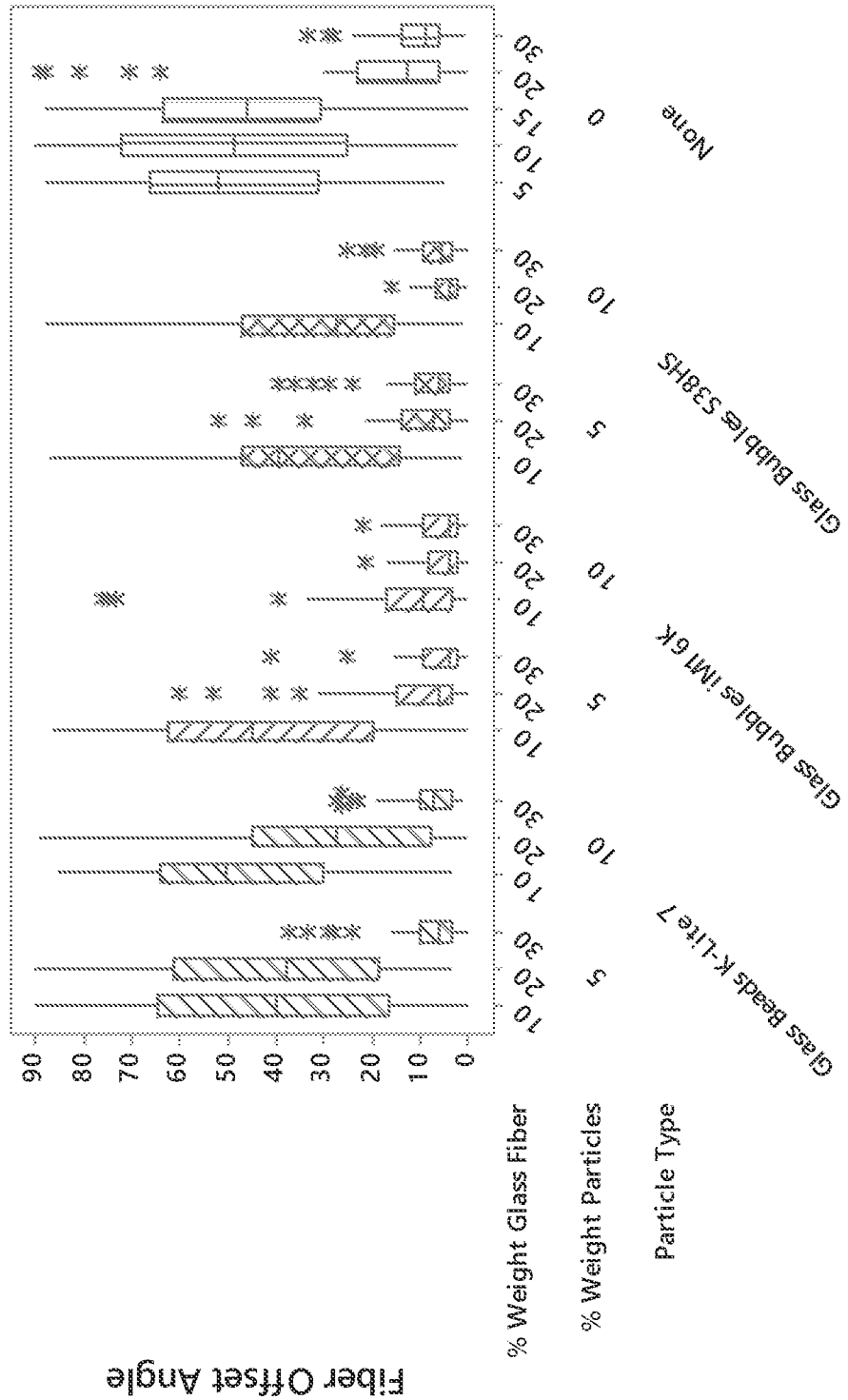
FIG. 19 is a box plot chart showing the orientation of fibers in experimental samples with spherical glass beads and bubbles.
Figure 20:
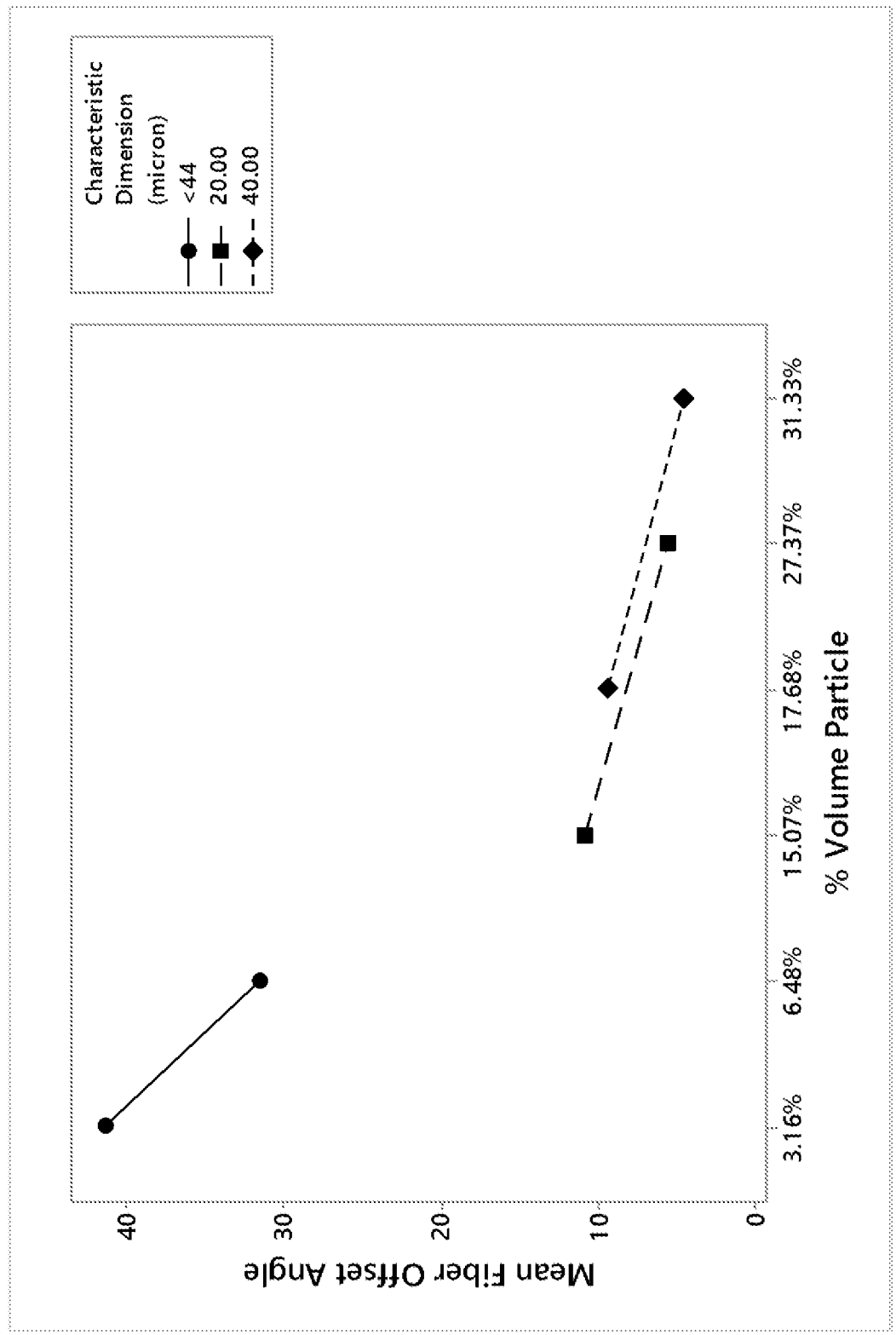
FIG. 20 is a chart showing the mean fiber offset angle as a function of volume percentage of spherical glass beads and bubbles in experimental samples with a 20% glass loading level.
Figure 21:
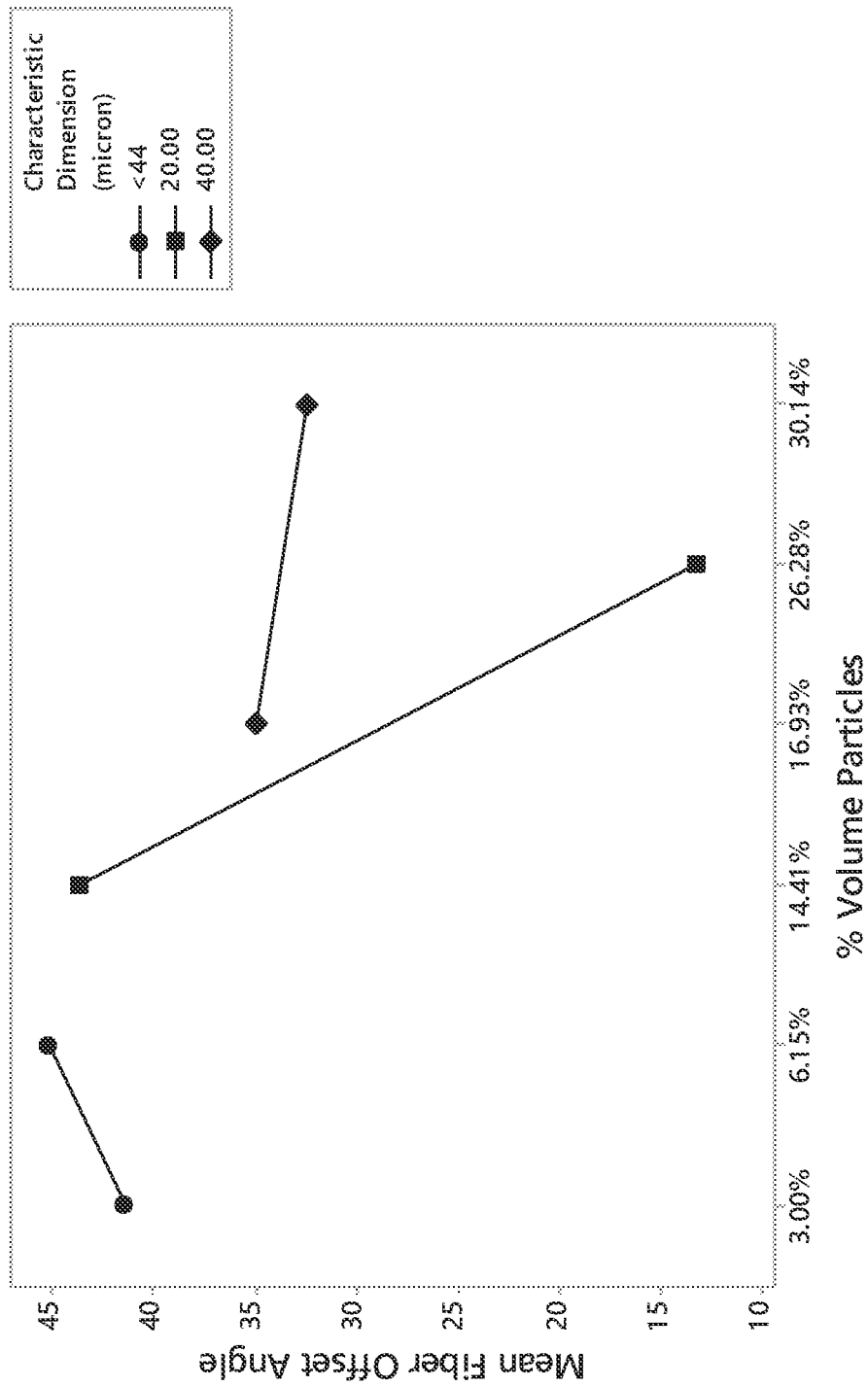
FIG. 21 is a chart showing the mean fiber offset angle as a function of volume percentage of spherical glass beads and bubbles in experimental samples with a 10% glass loading level.

The data are shown in Table 7 and FIG. 19. Generally, the glass beads tested appeared to outperform glass bubbles in causing non-alignment of fibers. As shown in FIGS. 20 and 21, between bead and bubbles at equal weight percentages there are substantially different volume percentages. FIG. 20 shows the mean fiber offset angle as a function of volume percentage of spherical glass beads and bubbles in experimental samples with a 20% glass loading level. FIG. 21 shows the mean fiber offset angle as a function of volume percentage of spherical glass beads and bubbles in experimental samples with a 10% glass loading level.

TABLE 7

| Formulation Type | Particle Type | Average Offset Angle (Degrees) | Standard Deviation (Degrees) |
|---|---|---|---|
| 1 | None | 49.6 | 22.4 |
| 2 | None | 48.4 | 26.7 |
| 3 | None | 45.7 | 25.9 |
| 4 | None | 18.4 | 20.3 |
| 5 | None | 10.7 | 7.3 |
| 6 | Glass Beads K-Lite 7 | 41.4 | 26.1 |
| 7 | Glass Beads K-Lite 7 | 45.1 | 23.7 |
| 8 | Glass Beads K-Lite 7 | 41.6 | 24.7 |
| 9 | Glass Beads K-Lite 7 | 31.5 | 26.3 |

TABLE 7-continued

| Formulation Type | Particle Type | Average Offset Angle (Degrees) | Standard Deviation (Degrees) |
|---|---|---|---|
| 10 | Glass Beads K-Lite 7 | 7.8 | 7.9 |
| 11 | Glass Beads K-Lite 7 | 8.2 | 6.8 |
| 6 | Glass Bubbles iM16K | 44.2 | 25.1 |
| 7 | Glass Bubbles iM16K | 13.2 | 16.8 |
| 8 | Glass Bubbles iM16K | 10.9 | 12.2 |
| 9 | Glass Bubbles iM16K | 5.4 | 4.5 |
| 10 | Glass Bubbles iM16K | 8.1 | 14.8 |
| 11 | Glass Bubbles iM16K | 5.7 | 4.7 |
| 6 | Glass Bubbles S38HS | 34.9 | 22.2 |
| 7 | Glass Bubbles S38HS | 32.5 | 22.6 |
| 8 | Glass Bubbles S38HS | 9.4 | 9.6 |
| 9 | Glass Bubbles S38HS | 4.6 | 3.5 |
| 10 | Glass Bubbles S38HS | 8.8 | 8.1 |
| 11 | Glass Bubbles S38HS | 6.5 | 5.1 |

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. An extruded building component comprising:
a first portion comprising a first composition, the first composition comprising
a first polymer resin, the first polymer resin selected from the group consisting of polylactic acid (PLA), polyvinylchloride (PVC), and polyethylene terephthalate (PET); and
cellulosic and/or lignocellulosic fibers, wherein the cellulosic and/or
lignocellulosic fibers exhibit a first fiber orientation;
a second portion comprising a second composition, the second composition comprising
a second polymer resin; and
glass fibers, wherein the glass fibers exhibit a second fiber orientation;
wherein the first fiber orientation is different than the second fiber orientation.

2. The extruded building component of claim 1, the extruded building component comprising a fenestration component.

3. The extruded building component of claim 1, the extruded building component comprising a window or door frame.

4. The extruded building component of claim 3, the second portion comprising an external portion of the window or door frame.

5. The extruded building component of claim 1, the second polymer resin selected from the group consisting of polylactic acid (PLA), polyvinylchloride (PVC), and polyethylene terephthalate (PET).

6. The extruded building component of claim 1, wherein the first polymer and the second polymer are the same.

7. The extruded building component of claim 1, the glass fibers selected from the group consisting of silica glasses, borosilicate glasses, alumino-silicate glasses, and alumino-borosilicate glasses.

8. The extruded building component of claim 1, the glass fibers having an average length after extrusion of about 0.2 mm to about 10 mm and an average diameter of about 2 microns to about 50 microns.

9. The extruded building component of claim 1, the first composition comprising from 10 to 70 wt. percent cellulosic and/or lignocellulosic fibers.

10. The extruded building component of claim 1, the second composition comprising from 10 to 70 wt. percent glass fibers.

11. The extruded building component of claim 1, wherein the glass fibers of the second composition exhibit an average offset angle relative to a direction of extrusion of the second portion that is at least 5 degrees different than an average offset angle relative to a direction of extrusion for the lignocellulosic fibers of the first composition.

12. The extruded building component of claim 1, wherein the second portion comprises at least one feature selected from the group consisting of an interior wall, an external wall, a corner, an appendage, a single wall area, and a joint between walls.

13. The extruded building component of claim 1, further comprising a third portion comprising a third composition different than the first and second compositions.

14. The extruded building component of claim 13, the third composition lacking fibers.

15. The extruded building component of claim 13, the third portion comprising a third layer contacting at least one of the first and second portions.

16. The extruded building component of claim 13, the third portion comprising a capstock layer and covering at least one of the first and second portions.

17. The extruded building component of claim 1, wherein the first portion and the second portion are coextruded.

18. An extruded building component comprising:
a first portion comprising a first composition, the first composition comprising
a first polymer resin; and
cellulosic and/or lignocellulosic fibers, wherein the cellulosic and/or lignocellulosic fibers exhibit a first fiber orientation;
a second portion comprising a second composition, the second composition comprising
a second polymer resin; and
glass fibers, wherein the glass fibers exhibit a second fiber orientation;
wherein the first fiber orientation is different than the second fiber orientation, the glass fibers selected from the group consisting of silica glasses, borosilicate glasses, alumino-silicate glasses, and alumino-borosilicate glasses.

19. An extruded building component comprising:
a first portion comprising a first composition, the first composition comprising
a first thermoplastic polymer resin; and
cellulosic and/or lignocellulosic fibers, wherein the cellulosic and/or lignocellulosic fibers exhibit a first fiber orientation;
a second portion comprising a second composition, the second composition comprising
a second thermoplastic polymer resin; and
glass fibers, wherein the glass fibers exhibit a second fiber orientation;
wherein the first fiber orientation is different than the second fiber orientation.

* * * * *